(12) United States Patent
Holtan et al.

(10) Patent No.: US 7,549,651 B2
(45) Date of Patent: Jun. 23, 2009

(54) CART COUPLER ASSEMBLY FOR CART COLLECTION MACHINES

(75) Inventors: Paul D. Holtan, Savage, MN (US); Daniel T. Johnson, Medina, MN (US)

(73) Assignee: Dane Industries, Inc., Brooklyn Park, MN (US)

(*) Notice: Subject to any disclaimer, the term of this patent is extended or adjusted under 35 U.S.C. 154(b) by 10 days.

(21) Appl. No.: 11/696,534

(22) Filed: Apr. 4, 2007

(65) Prior Publication Data
US 2007/0181352 A1 Aug. 9, 2007

Related U.S. Application Data

(63) Continuation of application No. 10/965,281, filed on Oct. 14, 2004, now abandoned.

(60) Provisional application No. 60/511,786, filed on Oct. 15, 2003.

(51) Int. Cl.
*B62D 39/00* (2006.01)

(52) U.S. Cl. .................... 280/33.992; 280/33.991; 180/19.1

(58) Field of Classification Search ............ 180/14.1, 180/19.1, 19.2, 210, 11; 280/33.992, 33.993, 280/33.998, 32.7, DIG. 4, 400
See application file for complete search history.

(56) References Cited

U.S. PATENT DOCUMENTS

| | | |
|---|---|---|
| 1,050,919 A | 1/1913 | Conley |
| 2,381,190 A | 8/1945 | Tiner et al. |
| 2,497,234 A | 2/1950 | Salvatore |
| 2,518,816 A | 8/1950 | Powers |
| 2,621,687 A | 12/1952 | William |
| 2,695,179 A | 11/1954 | Fancsali |
| 2,720,992 A | 10/1955 | Cushman |
| 2,790,513 A | 4/1957 | Draxler |
| 2,846,018 A | 8/1958 | Puckett |
| 2,877,911 A | 3/1959 | Arnot |
| 2,904,202 A | 9/1959 | Brady |

(Continued)

FOREIGN PATENT DOCUMENTS

AT  340315  12/1977

(Continued)

OTHER PUBLICATIONS

Non-Final Office Action, U.S. Appl. No. 11/682,562, 13 pages, Jan. 9, 2008.

(Continued)

*Primary Examiner*—Hau V Phan
(74) *Attorney, Agent, or Firm*—Dorsey & Whitney, P.A.

(57) ABSTRACT

The present invention is an improved cart coupler assembly for use on a shopping cart retriever vehicle. The cart coupler assembly provides a means for connecting shopping carts to the cart retriever vehicle. The cart coupler assembly may employ an actuator to move yokes into position to enable the yokes to engage shopping cart members. The cart coupler assembly may employ the upwardly facing concave surfaces of U-shaped yokes to engage the rear wheels of a shopping cart. In the place of yokes, the cart coupler assembly may utilize a shopping cart emulator that emulates one or more portions or features of a shopping cart in order to facilitate the engagement of the coupler assembly to a shopping cart.

17 Claims, 34 Drawing Sheets

U.S. PATENT DOCUMENTS

| | | | |
|---|---|---|---|
| 2,935,161 | A | 5/1960 | Comfort |
| 3,127,209 | A | 3/1964 | Faust et al. |
| 3,524,512 | A | 8/1970 | Voeks et al. |
| 3,575,250 | A | 4/1971 | Dykes et al. |
| 3,633,086 | A | 1/1972 | Speth et al. |
| 3,791,474 | A | 2/1974 | Stammen et al. |
| 3,876,024 | A | 4/1975 | Shieman et al. |
| 3,887,095 | A | 6/1975 | Suzuki |
| 4,053,025 | A | 10/1977 | Slusarenko |
| 4,096,920 | A | 6/1978 | Heyn |
| 4,265,337 | A | 5/1981 | Dammeyer |
| 4,266,903 | A | 5/1981 | Surbrook |
| 4,531,757 | A | 7/1985 | Kuhn |
| 4,573,549 | A | 3/1986 | Pankow |
| 4,611,948 | A | 9/1986 | Johnson |
| 4,634,337 | A | 1/1987 | Hamman |
| 4,730,685 | A | 3/1988 | Sinkkonen |
| 4,771,840 | A | 9/1988 | Keller |
| 4,793,763 | A | 12/1988 | Bubik |
| 4,878,050 | A | 10/1989 | Kelley |
| 4,942,529 | A | 7/1990 | Avitan et al. |
| 4,964,837 | A | 10/1990 | Collier |
| 5,011,169 | A | 4/1991 | Henderson et al. |
| 5,048,626 | A | 9/1991 | Stehler et al. |
| 5,064,012 | A | 11/1991 | Losego |
| 5,082,074 | A | 1/1992 | Fischer |
| 5,096,358 | A | 3/1992 | Plant et al. |
| 5,161,634 | A | 11/1992 | Ichihara et al. |
| 5,167,389 | A | 12/1992 | Reimers |
| 5,322,306 | A | 6/1994 | Coleman |
| 5,340,202 | A | 8/1994 | Day |
| 5,388,176 | A | 2/1995 | Dykstra et al. |
| 5,439,069 | A | 8/1995 | Beeler |
| 5,483,615 | A | 1/1996 | Hallidy |
| 5,511,926 | A | 4/1996 | Iles |
| 5,518,260 | A | 5/1996 | Grignon |
| 5,573,078 | A | 11/1996 | Stringer et al. |
| 5,580,207 | A | 12/1996 | Kiebooms et al. |
| 5,592,355 | A | 1/1997 | Ikkai et al. |
| 5,633,544 | A | 5/1997 | Toida et al. |
| 5,743,347 | A | 4/1998 | Gingerich |
| 5,762,155 | A | 6/1998 | Scheulderman |
| 5,769,051 | A | 6/1998 | Bayron et al. |
| 5,783,989 | A | 7/1998 | Issa et al. |
| 5,791,669 | A | 8/1998 | Broddon et al. |
| 5,808,376 | A | 9/1998 | Gordon et al. |
| 5,860,485 | A | 1/1999 | Ebbenga |
| 5,880,652 | A | 3/1999 | Snel |
| 5,934,694 | A | 8/1999 | Schugt et al. |
| 5,947,490 | A | 9/1999 | Munnoch et al. |
| 5,964,313 | A | 10/1999 | Guy |
| 5,983,614 | A | 11/1999 | Hancock et al. |
| 5,984,333 | A | 11/1999 | Constantijn et al. |
| 6,060,859 | A | 5/2000 | Jonokuchi et al. |
| 6,070,679 | A | 6/2000 | Berg et al. |
| 6,109,379 | A | 8/2000 | Madwed |
| 6,144,125 | A | 11/2000 | Birkestrand et al. |
| 6,168,367 | B1 | 1/2001 | Robinson |
| 6,220,379 | B1 | 4/2001 | Schugt et al. |
| 6,244,366 | B1 | 6/2001 | Otterson et al. |
| 6,260,643 | B1 | 7/2001 | Schuchardt |
| 6,352,130 | B2 | 3/2002 | Klein et al. |
| 6,378,642 | B1 | 4/2002 | Sutton |
| 6,406,250 | B2 | 6/2002 | Jaeger et al. |
| 6,435,803 | B1 | 8/2002 | Robinson |
| 6,481,514 | B2 | 11/2002 | Takada |
| D475,645 | S | 6/2003 | Hoonsbeen |
| 6,681,877 | B2 | 1/2004 | Ono et al. |
| 6,685,211 | B2 | 2/2004 | Iles |
| 6,729,421 | B1 | 5/2004 | Gluck et al. |
| 6,820,887 | B1 | 11/2004 | Riggle |
| 6,871,714 | B2 | 3/2005 | Johnson |
| 6,880,652 | B2 | 4/2005 | Holtan et al. |
| 7,134,515 | B2 | 11/2006 | Lenkman |
| 2003/0079923 | A1 | 5/2003 | Johnson |
| 2003/0231945 | A1 | 12/2003 | Weatherly |
| 2004/0134692 | A1 | 7/2004 | Kime et al. |
| 2004/0256166 | A1 | 12/2004 | Holtan et al. |
| 2005/0098362 | A1 | 5/2005 | Johnson |
| 2005/0098364 | A1 | 5/2005 | Johnson et al. |
| 2005/0116431 | A1 | 6/2005 | Holtan et al. |
| 2006/0000664 | A1 | 1/2006 | Huang et al. |
| 2006/0102392 | A1 | 5/2006 | Johnson et al. |
| 2006/0197295 | A1 | 9/2006 | Holtan et al. |
| 2006/0243500 | A1 | 11/2006 | Wiff et al. |
| 2007/0013157 | A1 | 1/2007 | Wiff et al. |
| 2007/0145707 | A1 | 6/2007 | Johnson |
| 2007/0289787 | A1 | 12/2007 | Wiff et al. |

FOREIGN PATENT DOCUMENTS

| | | |
|---|---|---|
| BE | 1012207 | 7/2000 |
| EP | 0326754 | 8/1989 |
| EP | 0405230 | 1/1991 |
| EP | 1454787 | 9/2004 |
| FR | 2246415 | 5/1975 |
| FR | 2587291 | 9/1985 |
| GB | 1601930 | 11/1981 |
| GB | 2332405 | 6/1999 |
| GB | 2342327 | 4/2000 |
| NL | 1016924 | 6/2002 |
| WO | WO88/06385 | 8/1988 |
| WO | WO96/03305 | 2/1996 |
| WO | WO01/85086 | 11/2001 |

OTHER PUBLICATIONS

Non-Final Office Action, U.S. Appl. No. 11/361,136, 10 pages, Jan. 10, 2008.

Non-Final Office Action, U.S. Appl. No. 11/254,564, 18 pages, Jan. 9, 2008.

Restriction Requirement, U.S. Appl. No. 10/836,593, 6 pages, Nov. 23, 2005.

Amendment and Response to Restriction Requirement, U.S. Appl. No. 10/836,593, 9 pages, Dec. 21, 2005.

Non-Final Office Action, U.S. Appl. No. 10/836,593, 20 pages, Feb. 13, 2006.

Amendment and Response to Non-Final Office Action, U.S. Appl. No. 10/836,593, 15 pages, Jul. 5, 2006.

Final Office Action, U.S. Appl. No. 10/836,593, 18 pages, Sep. 15, 2006.

Amendment and Response to Final Office Action, U.S. Appl. No. 10/836,593, 16 pages, Nov. 7, 2006.

Non-Final Office Action, U.S. Appl. No. 10/836,593, 17 pages, Jan. 22, 2007.

Amendment and Response to Non-Final Office Action, U.S. Appl. No. 10/836,593, 21 pages, May 22, 2007.

Final Office Action, U.S. Appl. No. 10/836,593, 22 pages, Aug. 14, 2007.

Amendment and Response to Office Action, U.S. Appl. No. 10/836,593, 15 pages, Oct. 31, 2007.

Non-Final Office Action, U.S. Appl. No. 10/836,593, 18 pages, Nov. 28, 2007.

Preliminary Amendment, U.S. Appl. No. 11/017,975, 10 pages, Mar. 3, 2005.

Restriction Requirement, U.S. Appl. No. 11/017,975, 5 pages, Jul. 26, 2005.

Amendment and Response to Restriction Requirement, U.S. Appl. No. 11/017,975, 12 pages, Aug. 23, 2005.

Non-Final Office Action, U.S. Appl. No. 11/017,975, 7 pages, Jan. 4, 2006.

Amendment and Response to Non-Final Office Action, U.S. Appl. No. 11/017,795, 16 pages, May 1, 2006.

Final Office Action, U.S. Appl. No. 11/017,795, 11 pages, Oct. 6, 2006.

Amendment and Response to Final Office Action, U.S. Appl. No. 11/017,795, 9 pages, Dec. 6, 2006.
Notice of Allowance, U.S. Appl. No. 11/017,795, 6 pages, Jan. 5, 2007.
Restriction Requirement, U.S. Appl. No. 10/965,281, 5 pages, Dec. 8, 2005.
Amendment and Response to Restriction Requirement, U.S. Appl. No. 10/965,281, 13 pages, Feb. 2, 2006.
Non-Final Office Action, U.S. Appl. No. 10/965,281, 15 pages, Mar. 28, 2006.
Amendment and Response to Non-Final Office Action, U.S. Appl. No. 10/965,281, 19 pages, Aug. 25, 2006.
Final Office Action, U.S. Appl. No. 10/965,281, 11 pages, Oct. 27, 2006.
Non-Final Office Action, U.S. Appl. No. 10/280,157, 7 pages, Apr. 1, 2003.
Amendment and Response to Non-Final Office Action, U.S. Appl. No. 10/280,157, 6 pages, May 1, 2003.
Non-Final Office Action, U.S. Appl. No. 10/280,157, 7 pages, Oct. 22, 2003.
Amendment and Response to Non-Final Office Action, U.S. Appl. No. 10/280,157, 13 pages, Mar. 22, 2004.
Final Office Action, U.S. Appl. No. 10/280,157, 7 pages, Jul. 15, 2004.
Amendment and Response to Final Office Action, U.S. Appl. No. 10/280,157, 8 pages, Aug. 24, 2004.
Notice of Allowance, U.S. Appl. No. 10/280,157, 5 pages, Oct. 6, 2004.
Dane Industries, Brochure "Productivity Solutions from the Industry Leader", 2 pages, 2001.
Dane Industries Product Brochure for QuicKART 1000 Power Pal, 2 pages, 2001.
Dane Industries Product Brochure for QuicKART 2000, 2 pages, 2001.
Dane Industries Product Brochure for PowerPal 3000, 2 pages, 2001.
Dane Industries Product Brochure for QuicKART 5000, 2 pages, 2001.
Declaration of David Leckey, Executive Vice President of Dane Technologies, Inc., attaching photos showing a motorized Quickart 2000 shopping cart mover with a htich that allows the Quickart 2000 to move two side-by-side lines of shopping carts, labeled "Exhibit A", "Exhibit B" and "Exhibit C", 4 pages, at least as early as Oct. 27, 2003.
Declaration of William A. Grimes, Senior Vice President of Dane Industries, Inc., attaching photos showing a motorized shopping cart mover and hitch, labeled "Exhibit E" and "Exhibit F", and showing a motorized shopping cart mover employing a second type of hitch for attaching to a shopping cart, labeled "Exhibit G", "Exhibit H" and "Exhibit I", 6 pages, at least as early as Autumn 2004.
Declaration of James W. Wiff, Vice President, Engineering and Product Development of Dane Industries, Inc., attaching photos showing various hitches observed at the United States Postal Service facility, labeled "Exhibit J", "Exhibit K", "Exhibit L", "Exhibit M" and "Exhibit N", 6 pages, at least as early as the period between Oct. 6, 2004 and Oct. 20, 2004.
Declaration of William A. Grimes, Senior Vice President of Retail Sales of Dane Industries, Inc., attaching photos showing a motorized shopping cart mover with a hitch that is configured to attach to a shopping cart, labeled "Exhibit O", "Exhibit P" and "Exhibit Q", 4 pages, at least as early as 2001.
Declaration of David A. Leckey, Executive Vice President of Dane Industries, Inc., attaching photos showing a hitch of a motorized shopping cart mover that is configured to receive the rear wheels of a shopping cart, labeled "Exhibit R", "Exhibit S" and "Exhibit T", 4 pages, at least as early as Aug. 4, 2003.
Declaration of William A. Grimes, Senior Vice President of Retail Sales of Dane Industries, Inc., attaching photos showing a hitch of a motorized shopping cart mover that is configured to enter the rear of a shopping cart, labeled "Exhibit U", "Exhibit V" and "Exhibit W", 4 pages, at least as early as Aug. 31, 2004.
Declaration of William A. Grimes, Senior Vice President of Dane Industries, Inc., attaching a photo showing a hitch of a motorized shopping cart mover that is configured to receive the rear wheels of a shopping cart, labeled "Exhibit X", 2 pages, at least as early as Jan. 13, 2003.
Declaration of James W. Wiff, Vice President, Engineering and Product Development of Dane Industries, Inc., attaching photos showing a collapsible pallet, labeled "Exhibit AA" and "Exhibit BB", 3 pages, at least as early as May 21, 2004.
Declaration of Paul D. Holtan, Senior Staff Engineer at Dane Industries, Inc., attaching photos showing a hitch for attachment to a motorized shopping cart mover, labeled "Exhibit X", "Exhibit XI", "Exhibit XII", "Exhibit XIII", "Exhibit XIV", "Exhibit XV", "Exhibit XVI", "Exhibit XVII" and "Exhibit XVII", 10 pages, at least as early as Jan. 1, 2002.
International Search Report, PCT/US2004/034009, Mar. 2, 2006.
Final Office Action, U.S. Appl. No. 11/682,562, 7 pages, Aug. 21, 2008.
Final Office Action, U.S. Appl. No. 11/254,564, 9 pages, Sep. 16, 2008.
Final Office Action, U.S. Appl. No. 11/361,136, 7 pages, Sep. 8, 2008.
Non-Final Office Action, U.S. Appl. No. 11/184,095, 9 pages, Apr. 4, 2008.
Notice of Appeal and Pre-Appeal Brief Conference Request, U.S. Appl. No. 10/836,593, 9 pages, Apr. 17, 2008.
Amendment and Response to Non-Final Office Action, U.S. Appl. No. 11/254,564, 21 pages, May 9, 2008.
Amendment and Response to Non-Final Office Action, U.S. Appl. No. 11/361,136, 9 pages, May 9, 2008.
Notice of Appeal to the Board of Patent Appeals and Interferences, U.S. Appl. No. 10/836,593, 3 pages, Apr. 4, 2008.

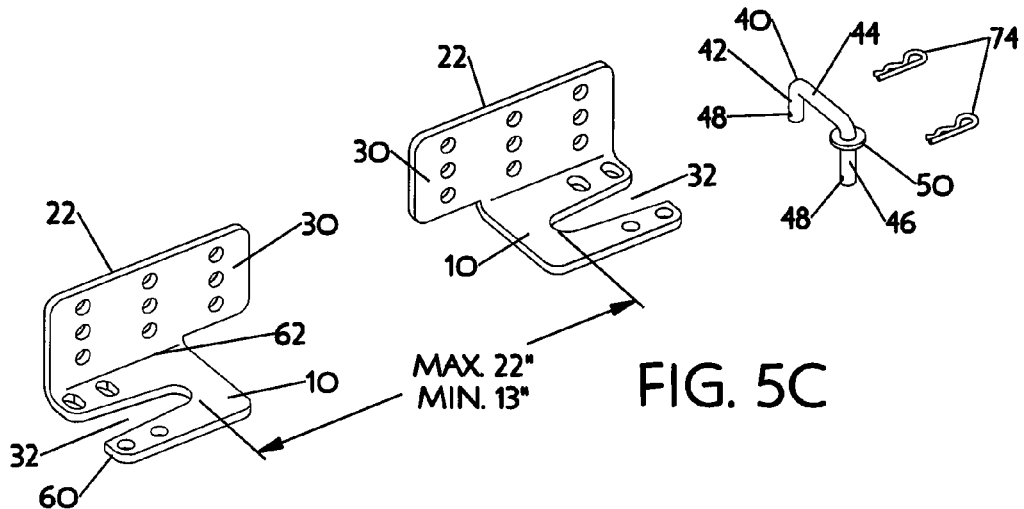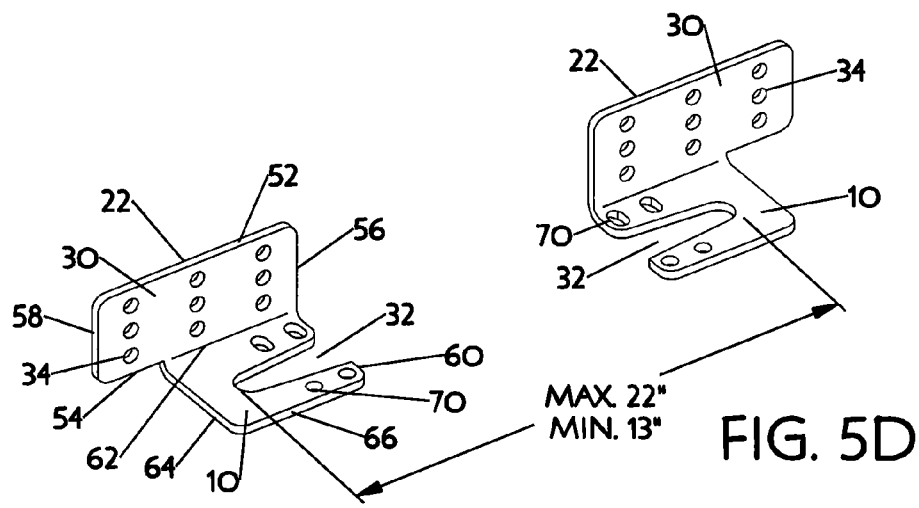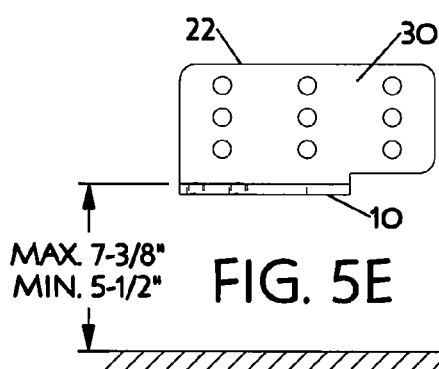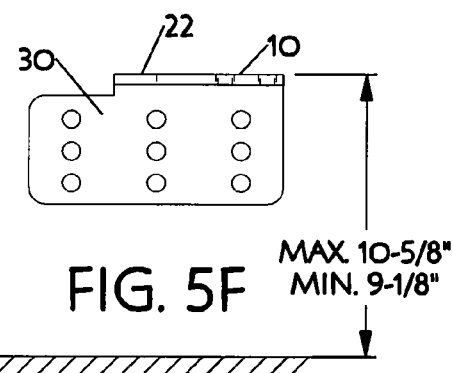

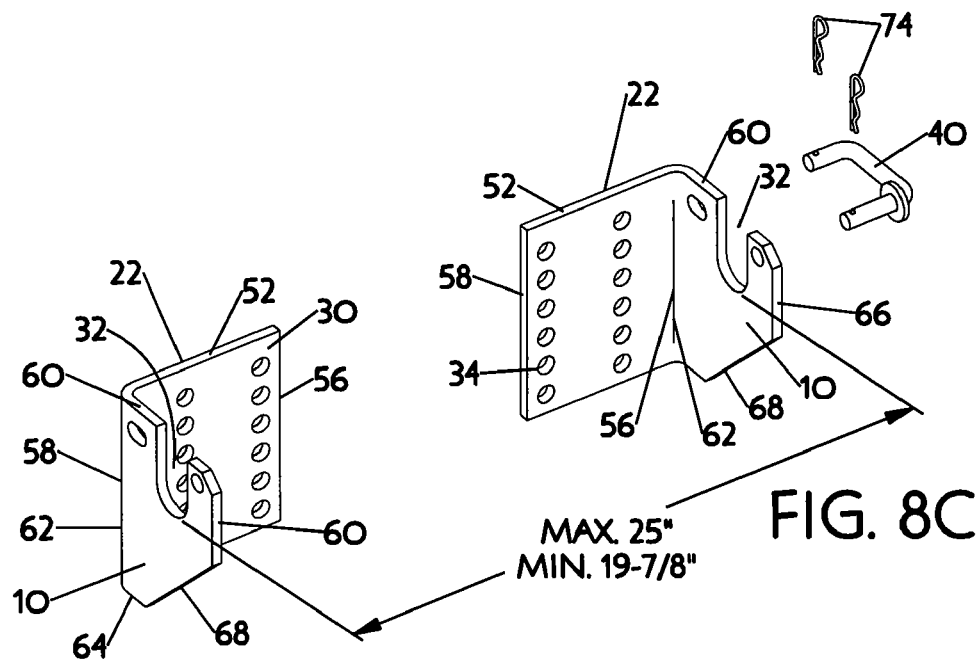
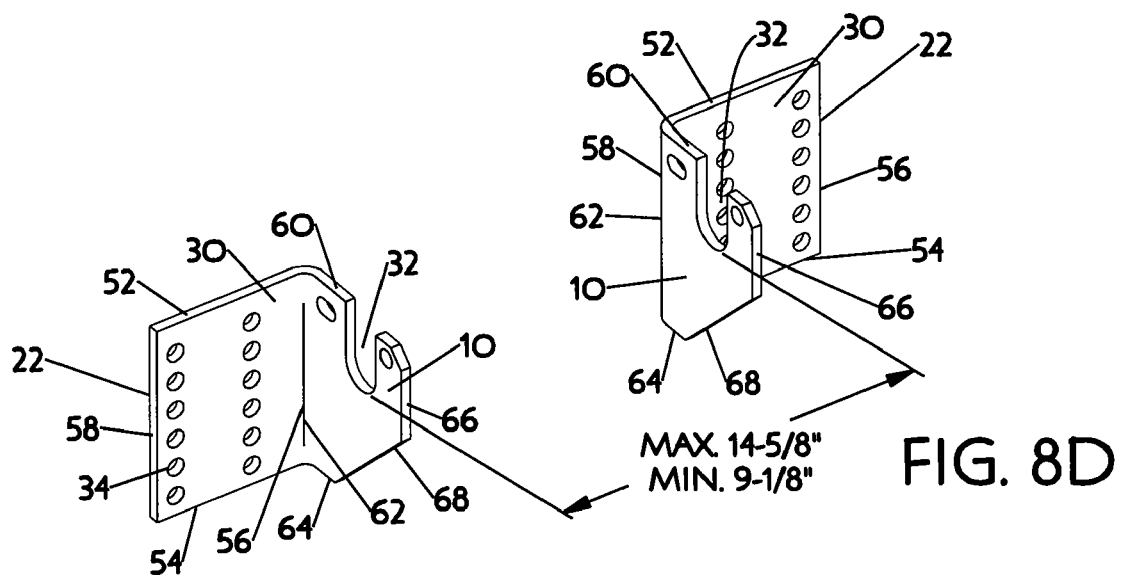
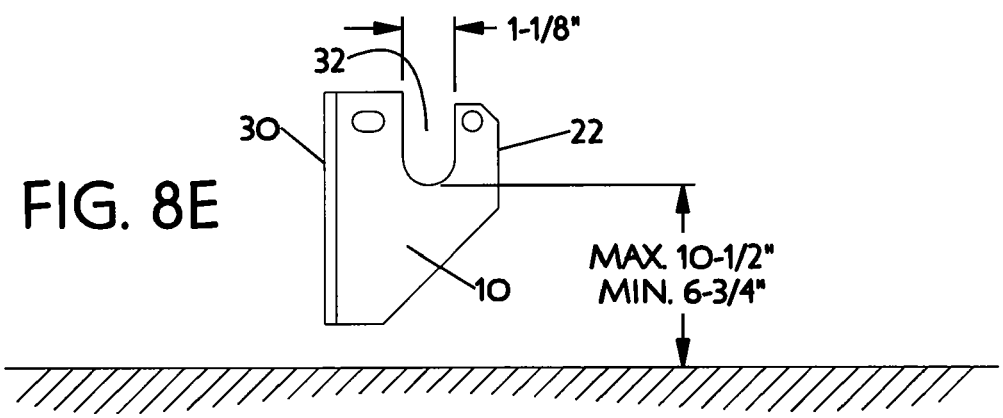

CART COUPLER ASSEMBLY FOR CART COLLECTION MACHINES

CROSS-REFERENCE TO RELATED APPLICATION

The present application is a continuation application of U.S. non-provisional patent application Ser. No. 10/965,281 ("the '281 application"), which was filed Oct. 14, 2004. The '281 application claims priority to U.S. provisional application No. 60/511,786 (the '786 application"), which was filed on Oct. 15, 2003. The '281 application and the '786 application are incorporated herein by reference in their entireties.

FIELD OF THE INVENTION

The present invention relates to devices and methods for assisting in the retrieval of wheeled shopping carts in parking lots. More specifically, the present invention relates to devices and methods for coupling shopping cart retrieval vehicles to shopping carts.

BACKGROUND OF THE INVENTION

Retrieving shopping carts in large parking lots is primarily a manual task. Workers push or pull a column of stacked wheeled shopping carts from various collection areas located throughout the parking lots. The longer the column of carts being pushed or pulled, the more difficult it becomes to control. Even with more than one worker, the collecting and guiding of long columns of carts is difficult and time consuming. Furthermore, in large parking lots, workers must push or pull the column of carts great distances. The retrieval task can be physically exhausting and may result in injury to the workers. Carts also can be damaged as the workers struggle to push or pull long columns to the store door.

The difficulties associated with manual retrieval of shopping carts led to the development of motorized cart retriever vehicles for pulling or pushing columns of shopping carts through parking lots in a train-like fashion. Examples of such motorized shopping cart retrievers are disclosed in U.S. Pat. No. 5,934,694 to Schugt et al., which issued Aug. 10, 1999, and U.S. Pat. No. 6,220,379 to Schugt et al., which issued Apr. 24, 2001. Both of these patents are hereby incorporated by reference in their entireties into the present application.

As shown in prior art FIG. 1, which a perspective view of a prior art motorized shopping cart retriever 2, the retriever 2 is provided with a shopping cart coupler assembly 4 mounted on an end of the retriever 2 (e.g., the front end 6 of the retriever 2). As indicated in prior art FIG. 2, which is an enlarged view of the cart coupler assembly 4 depicted in FIG. 1, the cart coupler assembly 4 includes a jaw bar 8 having two arcuate jaws 10 located on opposite ends of the jaw bar 8. The jaws 10 are oriented such that their openings face the same direction.

As can be understood from prior art FIG. 2, to engage the prior art cart coupler assembly 4 with a first shopping cart 12, the rear of the first shopping cart 12 is positioned so that the vertical rear frame members 14 are resting against the coupler assembly 4. The first shopping cart 12 is then manually slid sideways to cause the vertical rear frame members 14 to engage both jaws 10. A locking pin 16 is pushed across the open portion of a jaw 10 to secure the first shopping cart 12 to the cart coupler assembly 4. As additional carts are collected, they are stacked into the first shopping cart 12 that is secured to the cart coupler assembly 4. Stray carts are added to the front of the line as the collecting work proceeds.

While the prior art coupler assembly 4 is useful and functional, it is not compatible with all shopping cart configurations. Also, the prior art coupler assembly 4 requires an operator to manually move the shopping cart 12 into engagement with the coupler assembly 4.

There is a need in the art for a cart coupler assembly that is more readily attachable to a greater number of shopping cart configurations and requires less manual effort by an operator to couple to a shopping cart. There is also a need in the art for a method of attaching a cart coupler assembly to a shopping cart that is less manually intensive for an operator.

BRIEF SUMMARY OF THE INVENTION

The present invention provides a cart coupler assembly for use on shopping cart retriever vehicles. Cart retriever vehicles are known in the art and the cart coupler assemblies according to the present invention provide user-friendly ways to connect shopping cart to shopping cart retriever vehicles. One embodiment of the present invention utilizes an actuator to move various embodiments of yokes into various positions to engage a plurality of shopping cart members. In another embodiment, shopping carts are connected with the cart coupler assembly by placing the rear wheels of the shopping cart on upwardly facing concave surfaces of U-shaped yokes. In yet another embodiment, the cart coupler assembly emulates a shopping cart by having a modified shopping cart connected with the cart retriever vehicle. Another embodiment of the present invention emulates a shopping cart by having various members extending from the cart retriever vehicle to engage other shopping carts.

In one aspect of the present invention, a cart coupler assembly for a shopping cart retriever vehicle includes an actuator and at least one yoke connected with the actuator. The actuator can also include a driver device and at least one extension member connected with the driver device. The at least one yoke can be defined by a mounting portion connected with a jaw portion. In one embodiment, the jaw portion includes a slot. The jaw portion can also be defined by an upwardly facing concave surface.

In another form, the present invention provides a cart coupler assembly for a shopping cart retriever vehicle including an actuator, a first yoke and a second yoke. The actuator has a first extension arm and a second extension arm. The first yoke is defined by a first mounting portion and a first jaw portion. The second yoke is defined by a second mounting portion and a second jaw portion. The first yoke is connected with the first extension arm and the second yoke is connected with the second extension arm.

In yet another form, the cart coupler assembly for a cart retriever vehicle includes at least one mounting bracket and a cart emulator connected with the at least one mounting bracket. In one embodiment, the cart emulator is at least a portion of a shopping cart. In another embodiment, the emulator emulates at least a portion or a feature of a shopping cart. In either case, the emulator facilitates the engagement of the shopping cart to the cart retriever.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 5C is a perspective view of the yoke assemblies used in the outward capture embodiment depicted in FIGS. 5A-5B.

FIG. 5D is a perspective view of the yoke assemblies used in an inward capture embodiment of the cart coupler assembly depicted in FIGS. 5A-5B.

FIG. 5E is a front elevation of a yoke assembly with the jaw portion located at the bottom edge of the mounting portion.

FIG. 5F is a front elevation of a yoke assembly of FIG. 5E inverted with the jaw portion located at the uppermost part of the mounting portion.

FIG. 8C is a perspective view of the yoke assemblies used in the embodiment depicted in FIGS. 8A-8B.

FIGS. 8D is a perspective view of another embodiment of the yoke assemblies depicted in FIGS. 8A-8B.

FIG. 8E is a side elevation view of the yoke assemblies depicted in FIGS. 8C-8D.

DETAILED DESCRIPTION OF THE INVENTION

Figure 1:
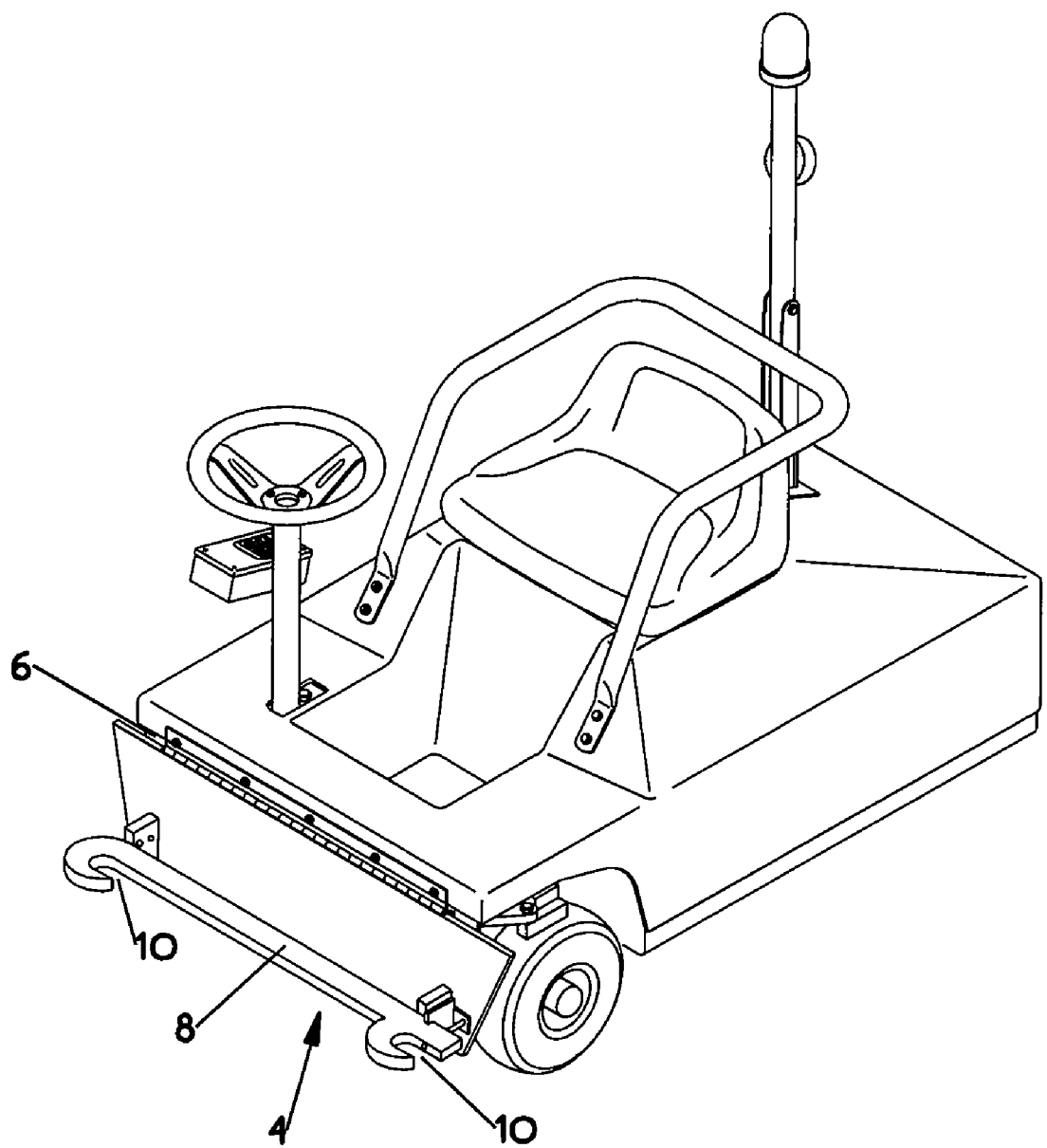
FIG. 1 is a perspective view of a prior art motorized shopping cart retriever that has a shopping cart coupler assembly mounted on its front end.
Figure 2:
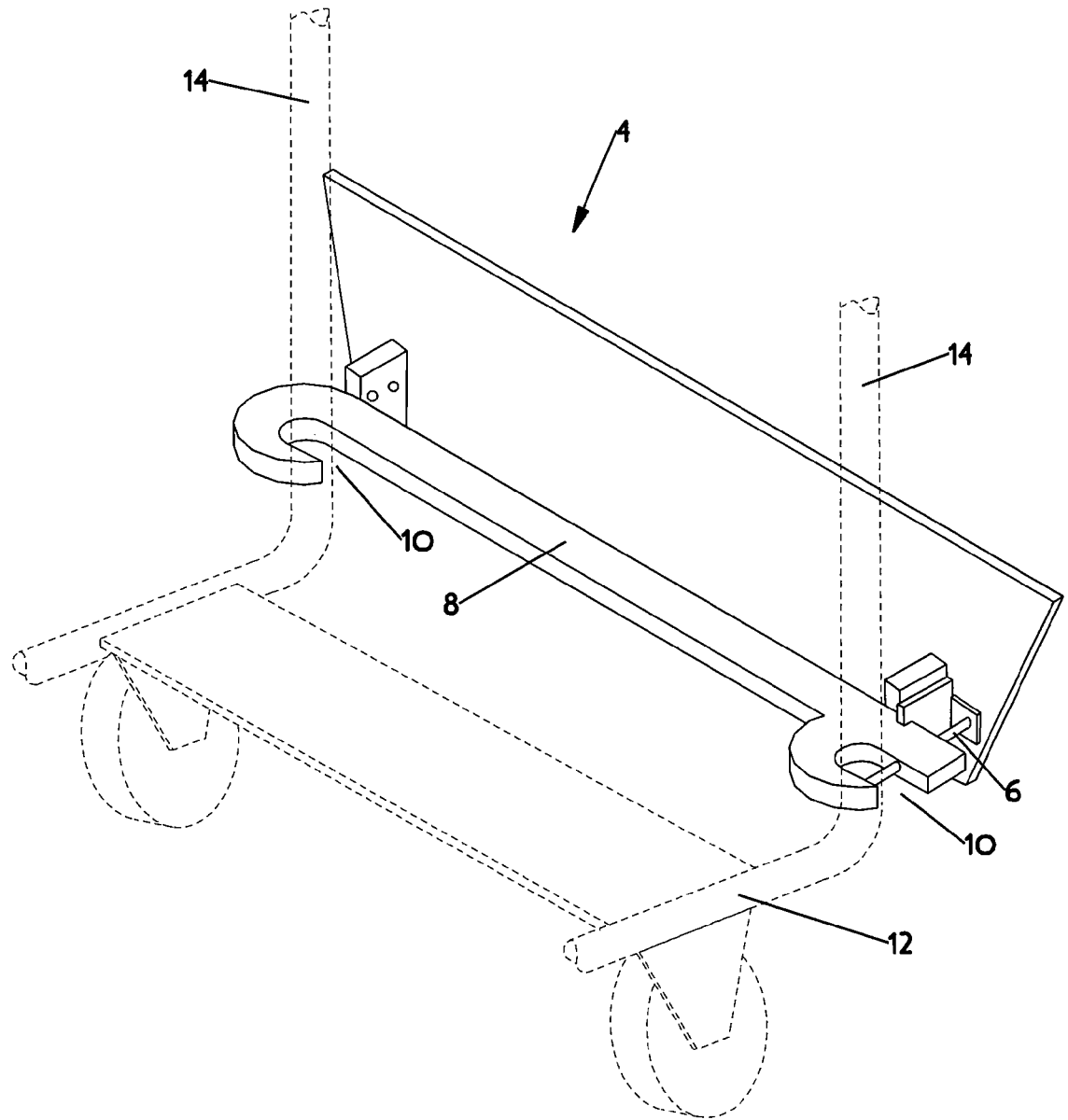
FIG. 2 is an enlarged view of the cart coupler assembly depicted in FIG. 1 and engaged with a first shopping cart.

The present invention, in one embodiment, is an improved cart coupler assembly 4 for use on a motorized shopping cart retriever 2. The cart coupler assembly 4 of the present invention provides for improved connection between a shopping cart 12 and a retriever 2. More specifically, the cart coupler 4 of the present invention is compatible with a greater number of shopping cart configurations and is less manually intensive to utilize as compared to the prior art cart couplers.

Several embodiments of the improved cart coupler assembly 4 of the present invention are discussed with reference to the following figures, FIGS. 3A-11G. When referring to these figures, directional references (e.g., right and left) are made with respect to a reference point defined when facing the front end 6 of the retriever 2. With respect to drawings that do not depict the retriever 2, directional references (e.g., right and left) are made with respect to the drawing sheet.

Figure 3A:
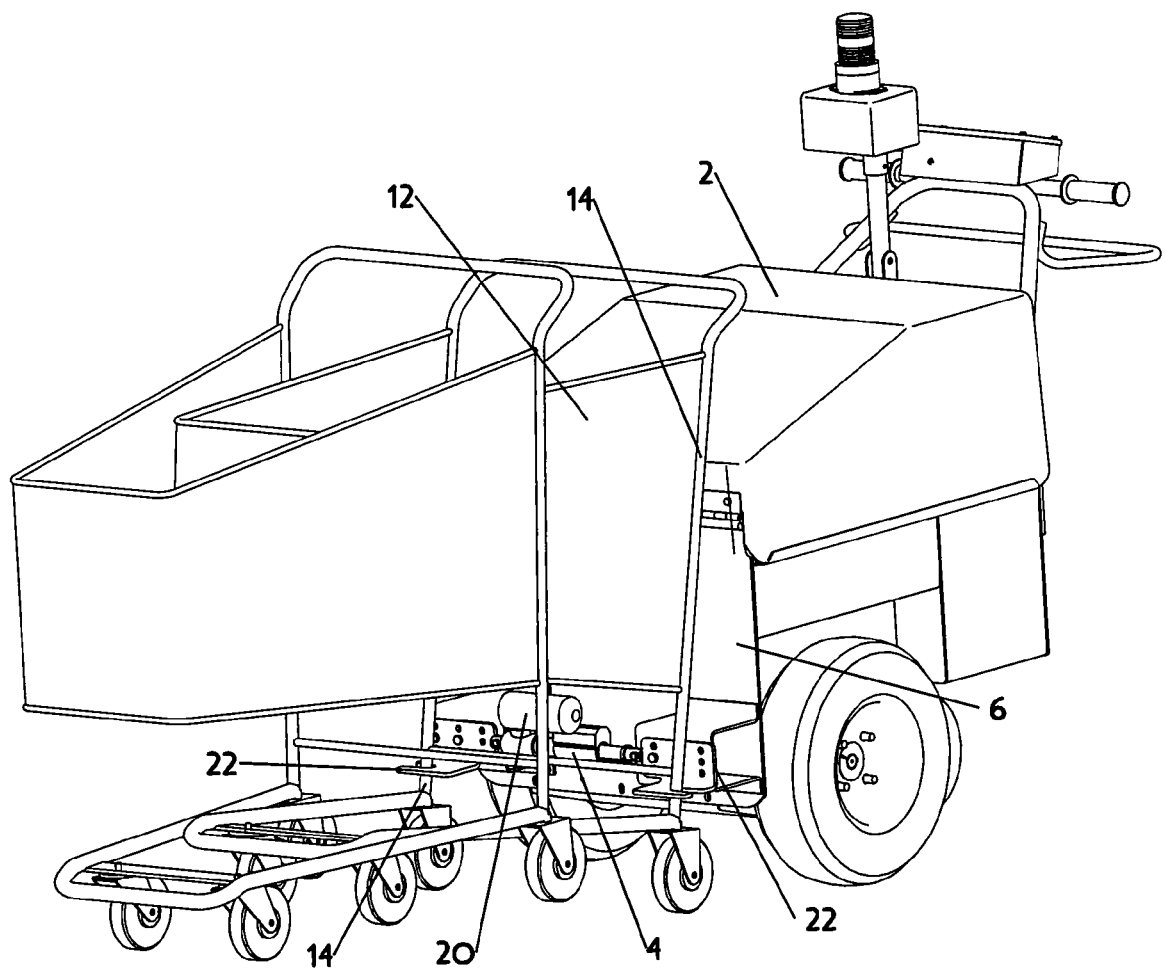
FIG. 3A is a perspective view of the front end of the retriever attached to a shopping cart via an outward capture configuration of the improved cart coupler assembly.
Figure 3B:
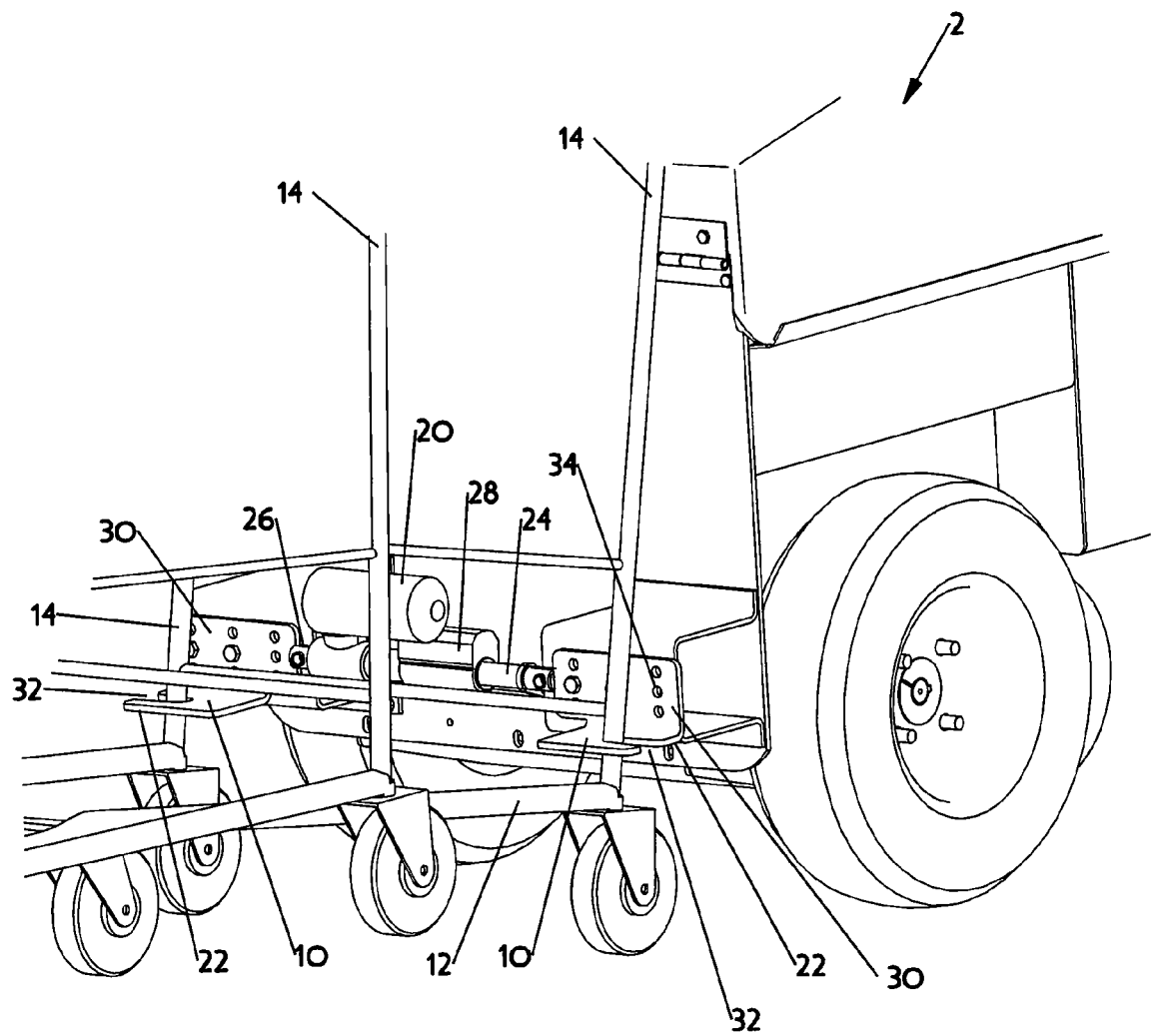
FIG. 3B is an enlarged view of the coupler assembly connecting to the shopping cart as depicted in FIG. 3A.

For a discussion of one embodiment of the improved cart coupler assembly 4, reference is now made to FIGS. 3A-3B. FIG. 3A is a perspective view of the front end 6 of the retriever 2 attached to a shopping cart 12 via an outward capture configuration of the improved cart coupler assembly 4. FIG. 3B is an enlarged view of the coupler assembly 4 connecting to the shopping cart 12 as depicted in FIG. 3A.

As illustrated in FIGS. 3A-3B, the outward capture configuration of the cart coupler assembly 4 includes an actuator 20, a right yoke 22, and a left yoke 22. The actuator 20 includes a first extension member 24 and a second extension member 26 connected with a driver device 28. The driver device 28 is used to extend and retract the first extension member 24 and the second extension member 26 relative to each other in opposite horizontal directions parallel to a travel surface upon which the retriever 2 and the first shopping cart 12 roll. Various configurations of the driver device 28 can be utilized to achieve desired extension and retraction motions of the first extension member 24 and the second extension member 26. For example, the driver device 28 can include an electric motor coupled with gears to actuate the extension members 24, 26. In another example, the driver device 28 utilizes an electric motor coupled with a hydraulic pump and piston arrangement to extend and retract the extension members 24, 26. In another example, the driver 28 utilizes an electric motor coupled with sheaves to actuate the extension members 24, 26 via cables and/or belts. Other driver devices 28 can be used that do not require electric motors, such as configurations that utilize solenoids, magnets, compressed air, or other gases. The use of the actuator 20, or similar device, provides an operator friendly method of attaching and removing the first shopping cart 12 to the retriever 2. In addition, some actuator embodiments maintain a restraining force on the yokes 22 to minimize the likelihood that the first shopping cart 12 will become disengaged from the cart coupler 4 assembly during use.

As shown in FIGS. 3A-3B, the right yoke 22 and the left yoke 22 each include a mounting portion 30 connected with a jaw portion 10. A slot 32 defining an open angle is located in the jaw portion 10. The open angle shape of the slot 10 allows different sizes of vertical rear frame members 14 or other components of the first shopping cart 12 to be secured to the cart coupler assembly 4. The mounting portion 30 of the right yoke 22 is connected with the first extension member 24, and the mounting portion 30 of the left yoke 22 is connected with the second extension member 26. A plurality of mounting holes 34 is also located in the mounting portion 30 for bolting the yokes 22 to the extension members 24, 26. The locations of the plurality of mounting holes 34 allow the yokes 22 to be connected with the actuator 20 to accommodate varying side-to-side spacing and mounting heights of different shopping carts 12. The yokes 22 may also be inverted for additional positions to adapt to various shapes of different shopping carts 12. Other embodiments of the present invention utilize yokes 22 that are permanently connected with the actuator 20. As discussed in more detail below, various yoke configurations can be utilized so that the jaw portions 10 can attach to other components of the first shopping cart 12 in addition to the vertical rear frame members 14.

To connect the first shopping cart 12 with the retriever 2 indicated in FIGS. 3A-3B, the operator uses the actuator 20 to retract the right yoke 22 and the left yoke 22 inward toward each other until the slots 32 on the right yoke 22 and the left yoke 22 can fit between the vertical rear frame members 14 of the first shopping cart 12. The first shopping cart 12 is then placed into position relative to the retriever 2 so that the vertical rear frame members 14 are located outside of each slot 32. The operator then uses the actuator 20 to move the right yoke 22 and the left yoke 22 in opposite directions relative to each other outwardly until the slots 32 located in the jaw portions 10 engage the vertical rear frame members 14 of the first shopping cart 12. Once the first shopping cart 12 is connected with the retriever 2, additional carts can be stacked to the first shopping cart 12.

Figure 4A:
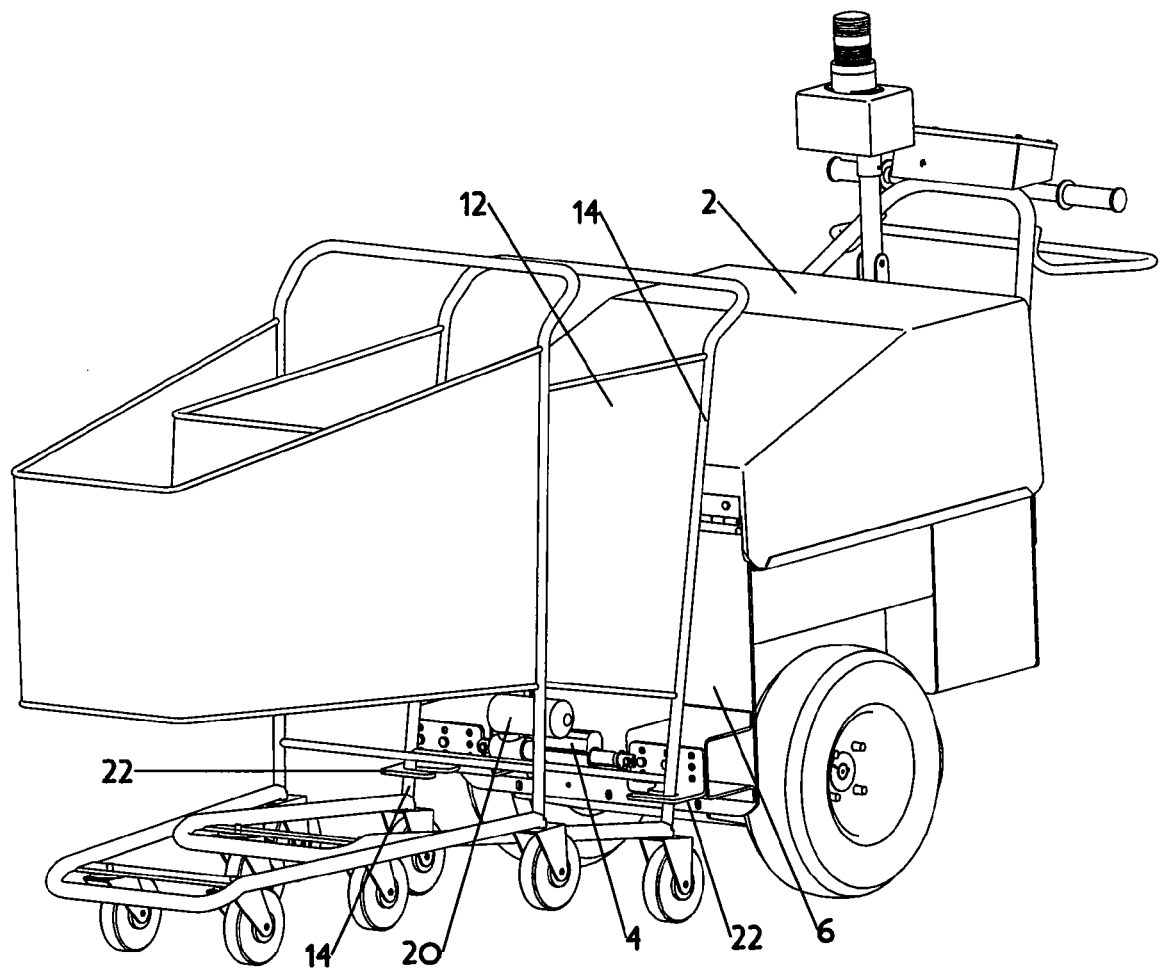
FIG. 4A is a perspective view of the front end of the retriever attached to a shopping cart via an inward capture configuration of the improved cart coupler assembly.
Figure 4B:
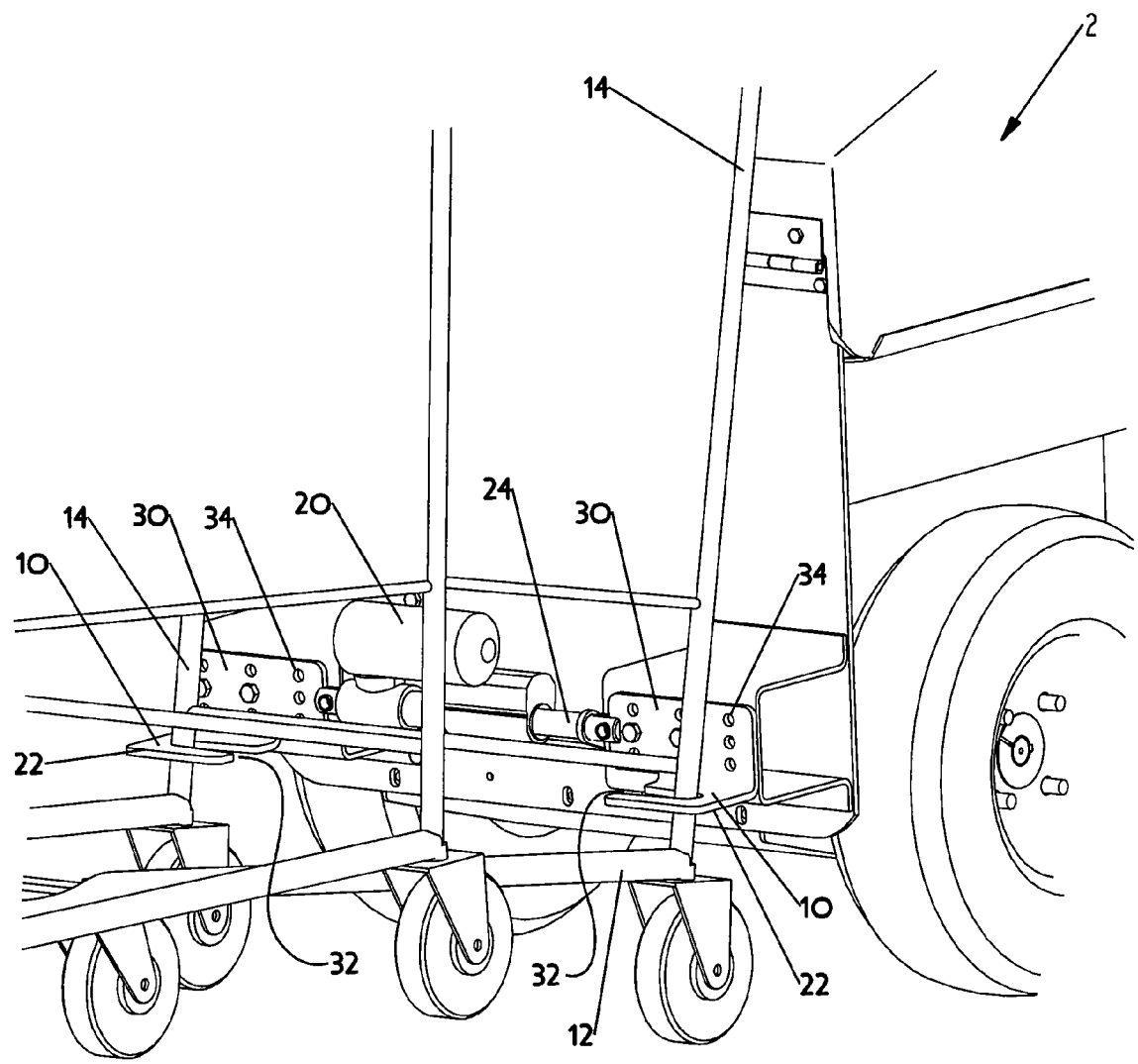
FIG. 4B is an enlarged view of the coupler assembly connecting to the shopping cart as depicted in FIG. 4A.

For a discussion of another embodiment of the improved cart coupler assembly 4, reference is now made to FIGS. 4A-4B. FIG. 4A is a perspective view of the front end 6 of the retriever 2 attached to a shopping cart 12 via an inward capture configuration of the improved cart coupler assembly 4. FIG. 4B is an enlarged view of the coupler assembly 4 connecting to the shopping cart 12 as depicted in FIG. 4A.

As indicated in FIGS. 4A-4B, the right yoke 22 and the left yoke 22 are configured such that the slots 32 located on the jaw portions face inwardly toward each other. In this configuration, the first shopping cart 12 is connected to the retriever 2 by the operator first using the actuator 20 to move the right yoke 22 and the left yoke 22 in opposite directions outwardly to positions until the vertical rear frame members 14 of the first shopping cart 12 can fit between the slots 32. The first shopping cart 12 is then placed into position relative to the retriever 2 with the vertical rear frame members 14 of the first shopping cart 12 located inside of each slot 32. The operator then uses the actuator 20 to move the right yoke 22 and the left yoke 22 inwardly until the slots 32 engage the vertical rear frame members 14 of the first shopping cart 12.

Figure 5A:
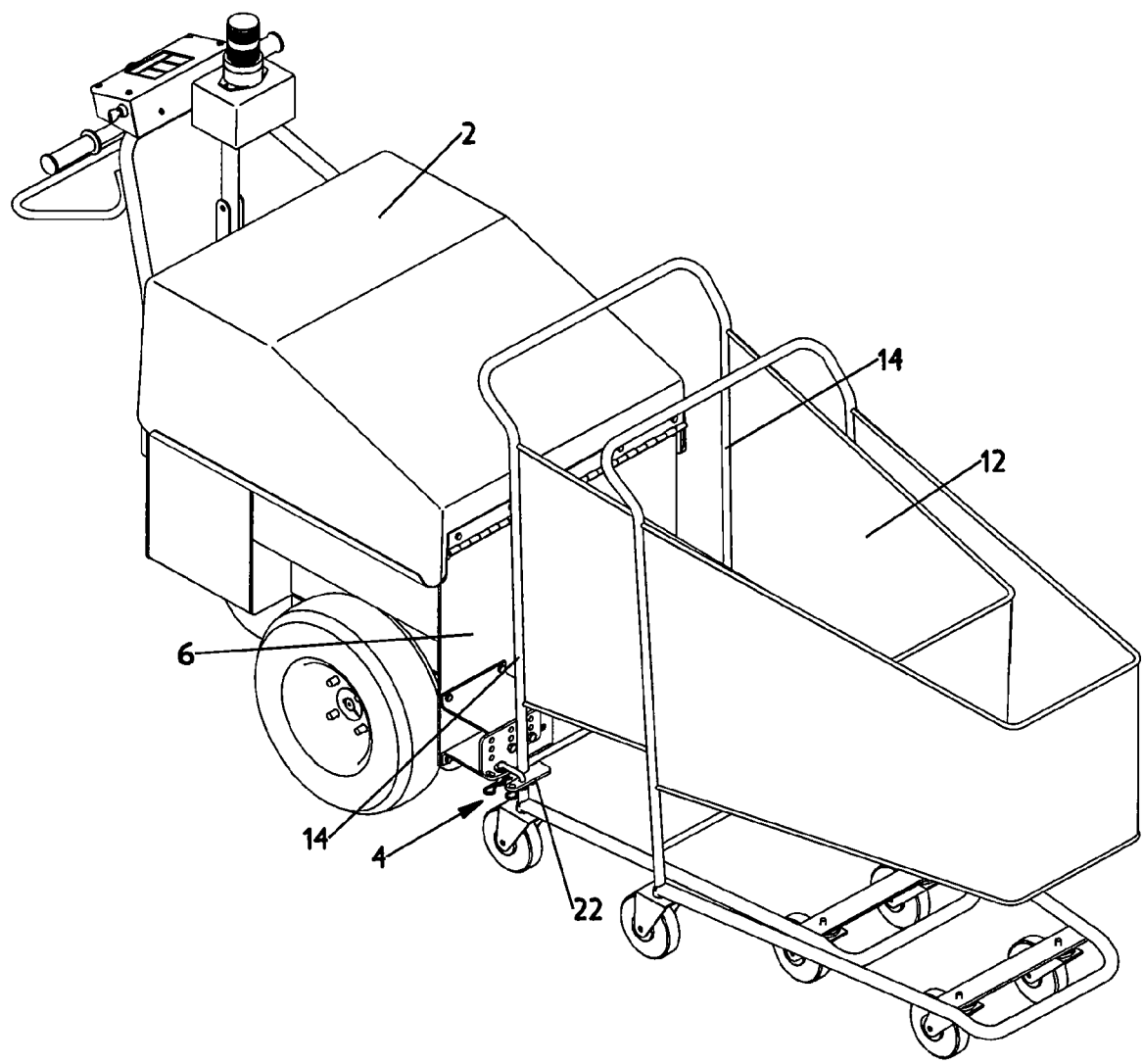
FIG. 5A is a perspective view of the front end of the retriever attached to a shopping cart via an outward capture configuration of the improved cart coupler assembly that further employs a U-pin at each jaw portion.
Figure 5B:
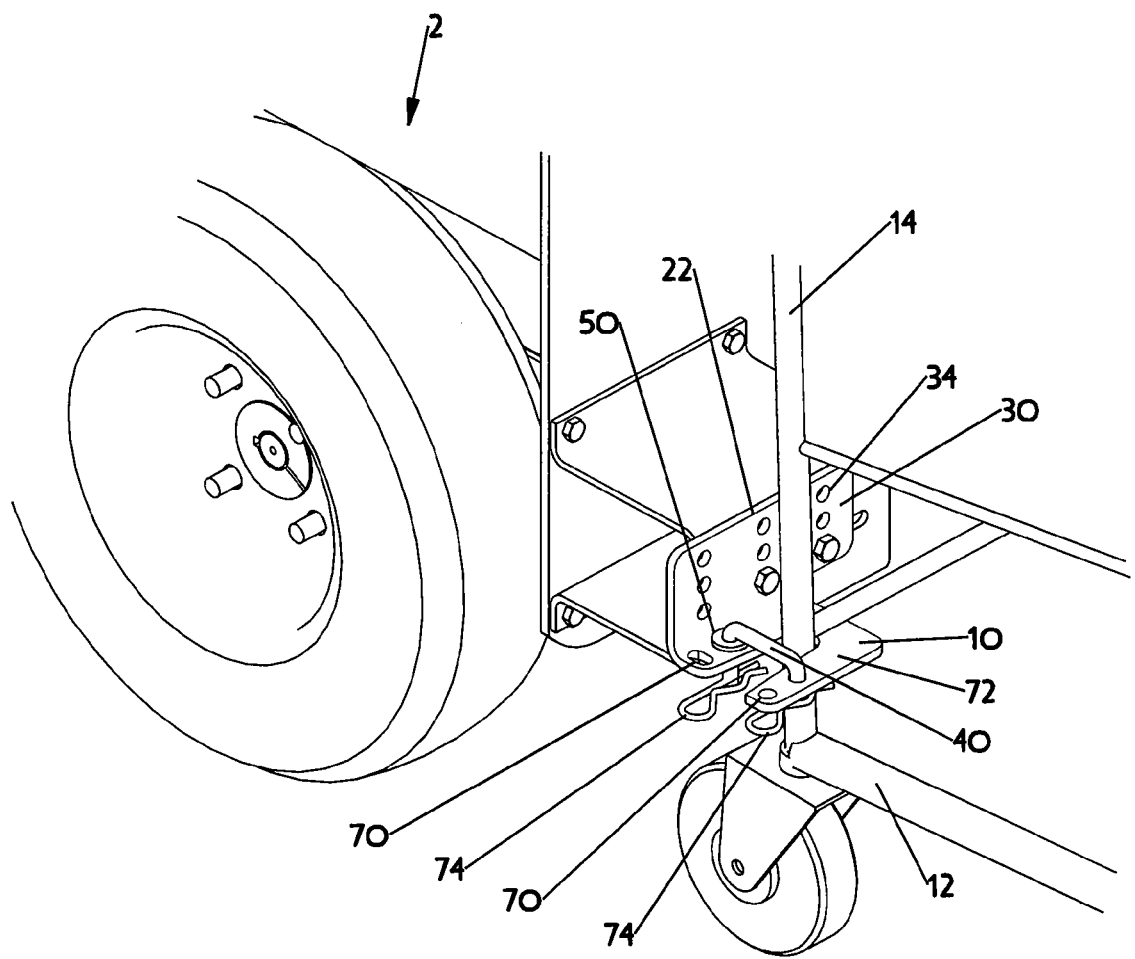
FIG. 5B is an enlarged view of the coupler assembly connecting to the shopping cart as depicted in FIG. 5A.

For a discussion of two more embodiment of the improved cart coupler assembly 4, reference is now made to FIGS. 5A-5D. FIG. 5A is a perspective view of the front end 6 of the retriever 2 attached to a shopping cart 12 via an outward capture configuration of the improved cart coupler assembly 4 that further employs a U-pin 40 at each jaw portion. FIG. 5B is an enlarged view of the coupler assembly 4 connecting to the shopping cart 12 as depicted in FIG. 5A. FIG. 5C is a perspective view of the yoke assemblies 22 used in the embodiment depicted in FIGS. 5A-5B. FIG. 5D is a perspective view of the yoke assemblies 22 used in an inward capture version of the cart coupler assembly 4 depicted in FIGS. 5A-5B.

As can be understood from FIGS. 5A-5D, the yoke embodiments 22 depicted in FIGS. 5A-5D are similar to the yokes 22 previously discussed with reference to FIGS. 3A-4B, except that the yokes 22 shown in FIGS. 5A-5D include a U-pin 40 that helps secure the vertical rear frame members 14 of the first shopping cart 12 inside the slot 32 of the jaw portion 10. The U-pin 40, which is most clearly depicted in FIG. 5C, has a generally circular cross section and is defined by a first region 42, a second region 44, and a third region 46. Clip holes 48 are located in the first region 42 and in the third region 46. The first region 42 is connected with the second region 44 forming generally a right angle between the two regions 42, 44. The second region 44 is connected with the third region 46 forming generally a right angle between the two regions 44, 46. A support platform 50 defining an upper surface and a lower surface is connected with the third region 46.

For each of the yoke embodiments 22 depicted in FIGS. 5C-5D, the mounting portion 30 is generally rectangular in shape and is defined by a top edge 52, a bottom edge 54, a right edge 56, and a left edge 58. Each jaw portion 10 is also generally rectangular in shape and is defined by a first edge 60, a second edge 62, a third edge 64, and a fourth edge 66 connected generally at right angles.

As depicted in FIG. 5C, each of the two yokes 22 is constructed such that the slot 32 located in the jaw portion 10 extends inwardly from the first edge 60 of the jaw portion 10. The second edge 62 of the jaw portion 10 is connected with the bottom edge 54 of the mounting portion 30 beginning at a point where the bottom edge 54 intersects with the right edge 56. Each yoke 22 is a mirror image of the other yoke 22.

As depicted in FIG. 5D, each of the two yokes 22 is constructed such that the slot 32 located in the jaw portion 10 extends outwardly from the first edge 60 of the jaw portion 10. The second edge 62 of the jaw portion 10 is connected with the bottom edge 54 of the mounting portion 30 beginning at a point where the bottom edge 54 intersects with the right edge 56. Again, each yoke 22 is a mirror image of the other yoke 22.

As shown in FIGS. 5C-5D, the bottom edge 54 of the mounting portion 30 is longer than the second edge 62 of the jaw portion 10. As can be understood from FIG. 5C, when connected with the cart coupler assembly 4 and arranged in the outward capture configuration, the slots 32 of the yokes 22 face away from each other. Similarly, as can be understood from FIG. 5D, when connected with the cart coupler assembly 4 and arranged in the inward capture configuration, the slots 32 of the yokes 22 face towards each other.

The point of connection between the mounting portion 30 and the jaw portion 10 may vary depending on the embodiment. For example, as depicted in FIG. 5E, which is a front elevation of a yoke assembly 22, the jaw portion 10 may be located at the bottom edge 54 of the mounting portion 30. In another example, as depicted in FIG. 5F, which is a front elevation of a yoke assembly 22, the yoke 22 may be simply inverted such that the bottom edge 54 becomes the top edge and the jaw portion 10 is located at the uppermost part of the mounting portion 30. This adds flexibility to the coupler assembly 4 that allows the jaws 10 to attach to various shapes of different shopping carts 12. In one embodiment, the jaw portion 10 may be connected to the top edge 52 of the mounting portion 30. For each of FIGS. 5C-5F, preferred dimensions are provided in the figure that correspond to the particular yoke embodiment 22 depicted therein.

Although other configurations can be utilized, in one embodiment, the plurality of mounting holes 34 in the mounting portions 30 shown in FIGS. 5C-5F are arranged in three vertical rows of three holes nearly spanning the length of the right and left edges 56, 58 of the mounting portions 30. As illustrated in FIGS. 5C-5D, in one embodiment, four pinholes 70 are also located on the outside of the angled slot 32 in the jaw portions 10. Other embodiments utilize alternative mounting hole 34 and pin hole 70 arrangements. As previously stated, the locations of the plurality of mounting holes 34 allow the yokes 22 to be connected with the cart coupler assembly 4 to accommodate varying side to side spacing and mounting heights for different shopping carts 12.

As indicated in FIGS. 5A-5C, the U-pin 40 is connected with the yoke 22 by inserting the first region 42 and third region 46 into corresponding pin holes 70 until the lower surface of the support platform 50 rests against a top surface 72 of the jaw portion 10. Once connected with the yoke 22, the clip holes 48 are positioned below a bottom surface of the jaw portion 10. Clips 74 can then be inserted into the clip holes 48 located in the first region 42 and the third region 46 to prevent the U-pin 40 from coming loose when using the retriever 2 to collect carts 12.

Figure 6A:
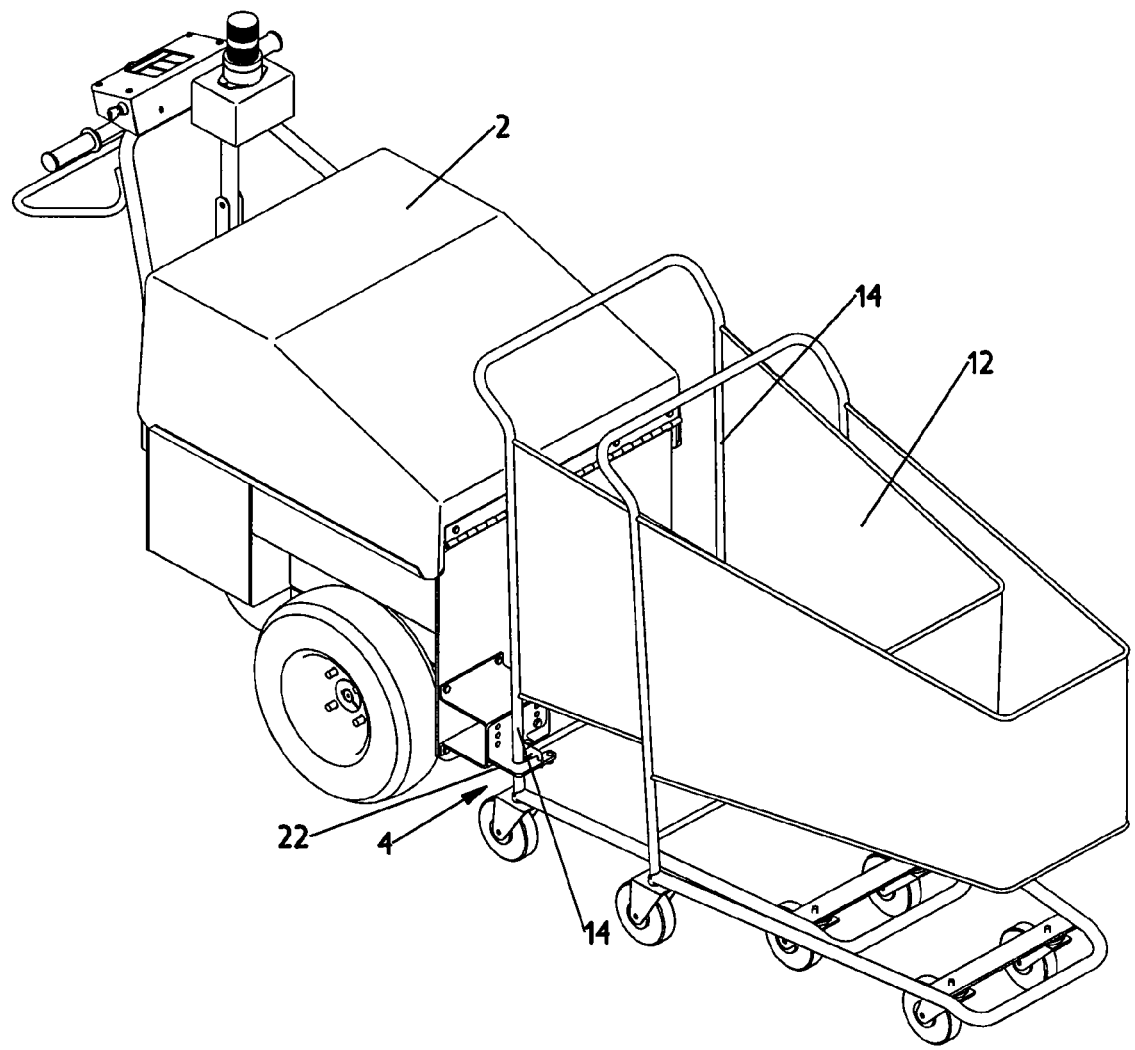
FIG. 6A is a perspective view of the front end of the retriever attached to a shopping cart via a side engagement configuration of the improved cart coupler assembly that, in one embodiment, further employs a U-pin at each jaw portion.
Figure 6B:
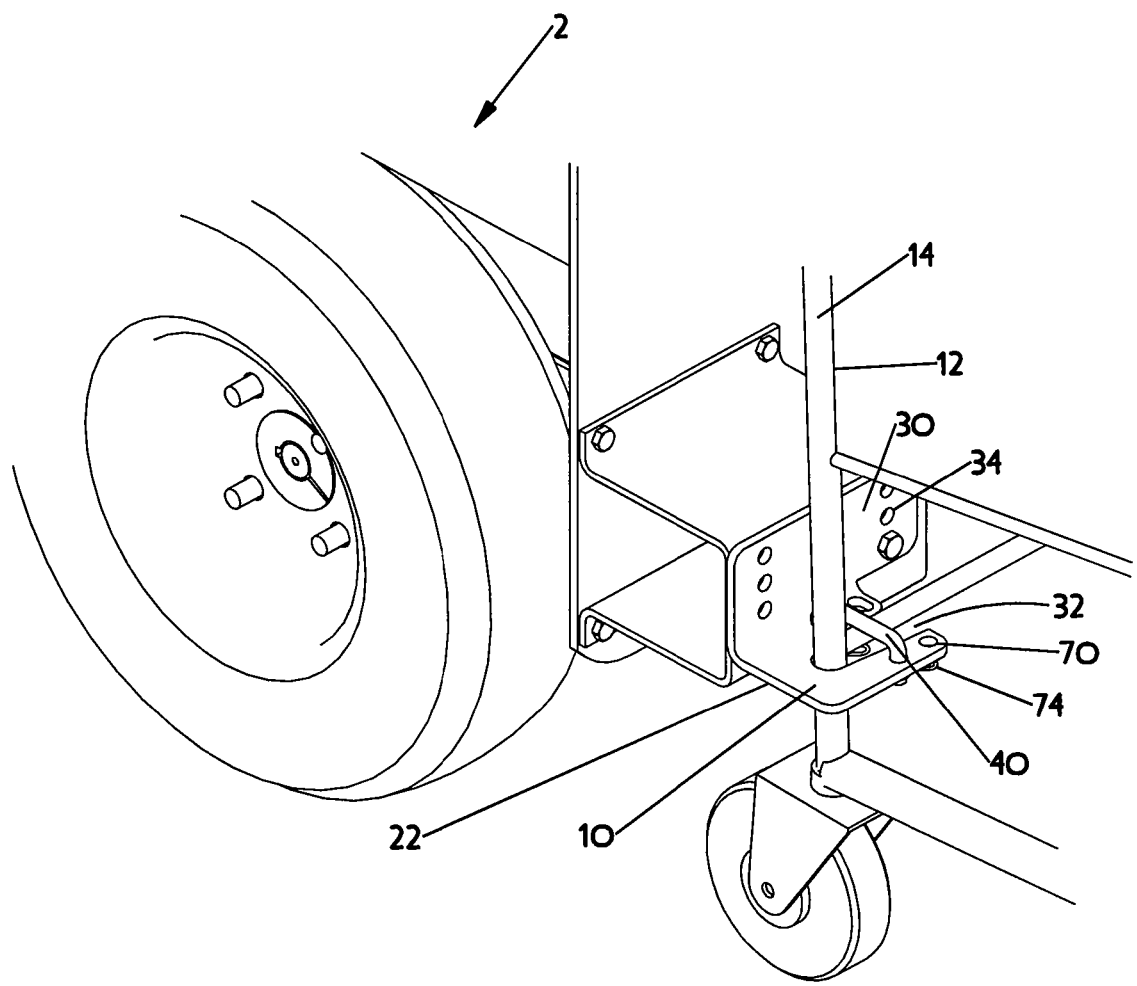
FIG. 6B is an enlarged view of the coupler assembly connecting to the shopping cart as depicted in FIG. 6A.
Figure 6C:
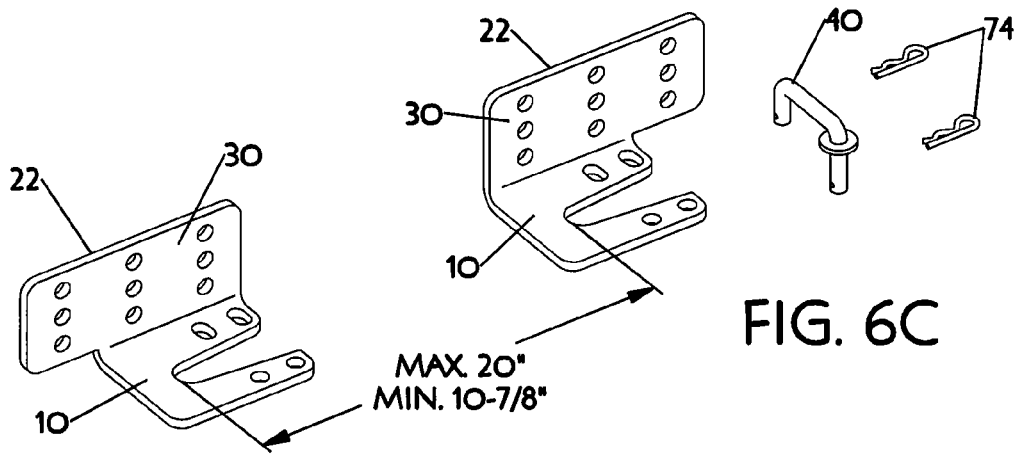
FIG. 6C is a perspective view of the yoke assemblies used in the embodiment depicted in FIGS. 6A-6B.
Figure 6D:
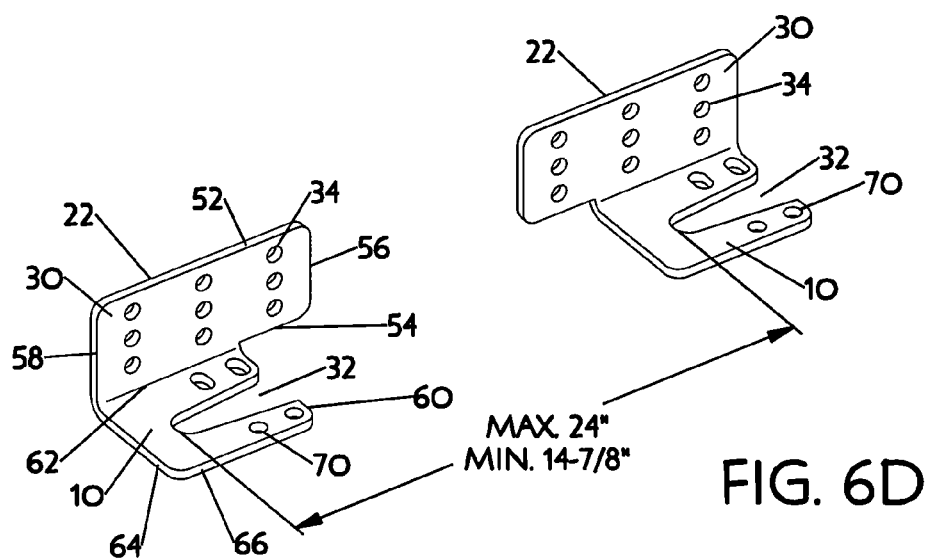
FIG. 6D is a perspective view of another embodiment of the yoke assemblies depicted in FIGS. 6A-6B.

For a discussion of another embodiment of the improved cart coupler assembly 4, reference is now made to FIGS. 6A-6D. FIG. 6A is a perspective view of the front end 6 of the retriever 2 attached to a shopping cart 12 via an side engagement configuration of the improved cart coupler assembly 4 that, in one embodiment, further employs a U-pin 40 at each jaw portion 10. FIG. 6B is an enlarged view of the coupler assembly 4 connecting to the shopping cart 12 as depicted in FIG. 6A. FIG. 6C is a perspective view of the yoke assemblies 22 used in the embodiment depicted in FIGS. 6A-6B. FIG. 6D is a perspective view of another embodiment of the yoke assemblies 22 depicted in FIGS. 6A-6B.

As can be understood from FIGS. 6A-6D, the cart coupler assembly 4 can be configured in a side engagement configuration where the slots 32 on the right yoke 22 and the left yoke 22 are open in the rightward direction. As shown in FIGS. 6A-6B, the first shopping cart 12 is connected with the retriever 2 by placing the first shopping cart 12 into position relative to the retriever 2 with the vertical rear frame members 14 of the first shopping cart 12 located to the right of each slot 32. The operator then uses the actuator 20 to move the right yoke 22 and the left yoke 22 to the right toward the vertical rear frame members 14 of the first shopping cart 12 until the slots 32 engage the vertical rear frame members 14 of the first shopping cart 12. The operator then installs the U-pins 40 in each jaw portion 10 to hold the vertical rear frame members 14 in position while using the retriever 2. In an alternative configuration, the cart coupler assembly 4 shown in FIGS. 6A-6B is configured to operate with both slots 32 opening toward the left.

The U-pin 40 shown in FIG. 6C is the same as the U-pin 40 previously described with reference to FIG. 5C. A comparison of the yokes 22 in FIGS. 5C-5D and 6C-6D reveals that the left yoke 22 in FIG. 6C and the right yoke 22 of FIG. 6D are the same as the right yoke 22 depicted in FIG. 5C. Also, while the right yoke 22 of FIG. 6C and the left yoke 22 of FIG. 6D have the same mounting portion 30 and jaw portion 10 as the right yoke 22 of FIG. 5C, the right yoke 22 of FIG. 6C and the left yoke 22 of FIG. 6D are constructed such that their jaw portions 10 are shifted to left such that their third edges 64 are flush with the left edges 58 of the mounting portions 30.

Depending upon the sizing requirements for a particular retriever 2 and shopping cart 12, the right yoke of FIG. 6C could be replaced with a yoke 22 that is identical to the left yoke 22 of FIG. 6C. Similarly, the right yoke 22 of FIG. 6D could be replaced with a yoke 22 that is identical to the left yoke 22 of FIG. 6D.

Figure 6E:
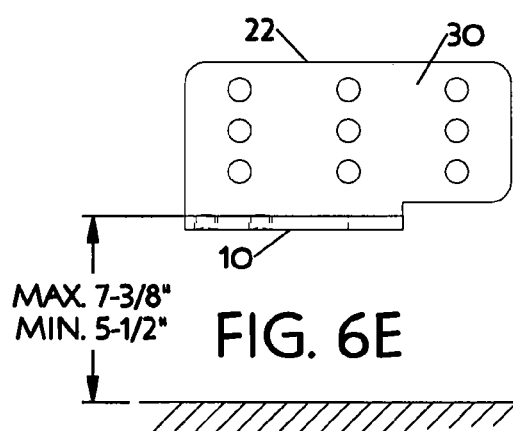
FIG. 6E is a front elevation of a yoke assembly illustrating that the jaw portion may be located at the bottom edge of the mounting portion.
Figure 6F:
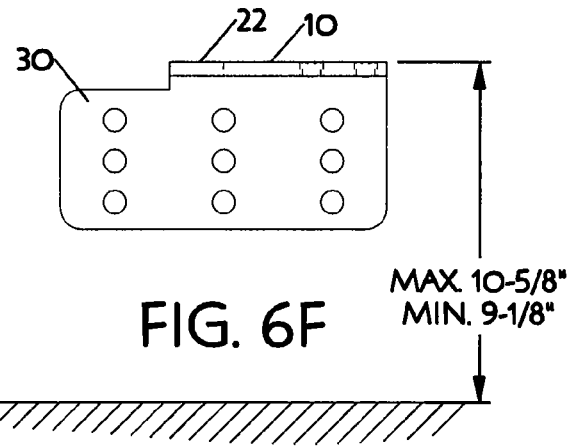
FIG. 6F is a front elevation of a yoke assembly illustrating that the yoke assembly may be inverted such that the jaw portion is located at the top of the mounting portion.

The point of connection between the mounting portion 30 and the jaw portion 10 may vary depending on the embodiment. For example, as depicted in FIG. 6E, which is a front elevation of a yoke assembly 22, the jaw portion 10 may be located at the bottom edge 54 of the mounting portion 30. In another example, as depicted in FIG. 6F, which is a front elevation of a yoke assembly 22, the yoke 22 may be simply inverted such that the bottom edge 54 becomes the top edge and the jaw portion 10 is located at the uppermost part of the mounting portion 30. This adds flexibility to the coupler assembly 4 that allows the jaws 10 to attach to various shapes of different shopping carts 12. In one embodiment, the jaw portion 10 may be connected to the top edge 52 of the mounting portion 30. For each of FIGS. 6C-6F, preferred dimensions are provided in the figure that correspond to the particular yoke 22 embodiment depicted therein.

The plurality of mounting holes 34 and pin holes 70 shown in FIGS. 6C-6F are arranged in the same manner as the mounting holes 34 shown in FIGS. 6C-6F. However, other mounting hole 34 and pinhole 70 arrangements can be utilized on the yokes 22 depicted in FIGS. 6C-6F.

Figure 7A:
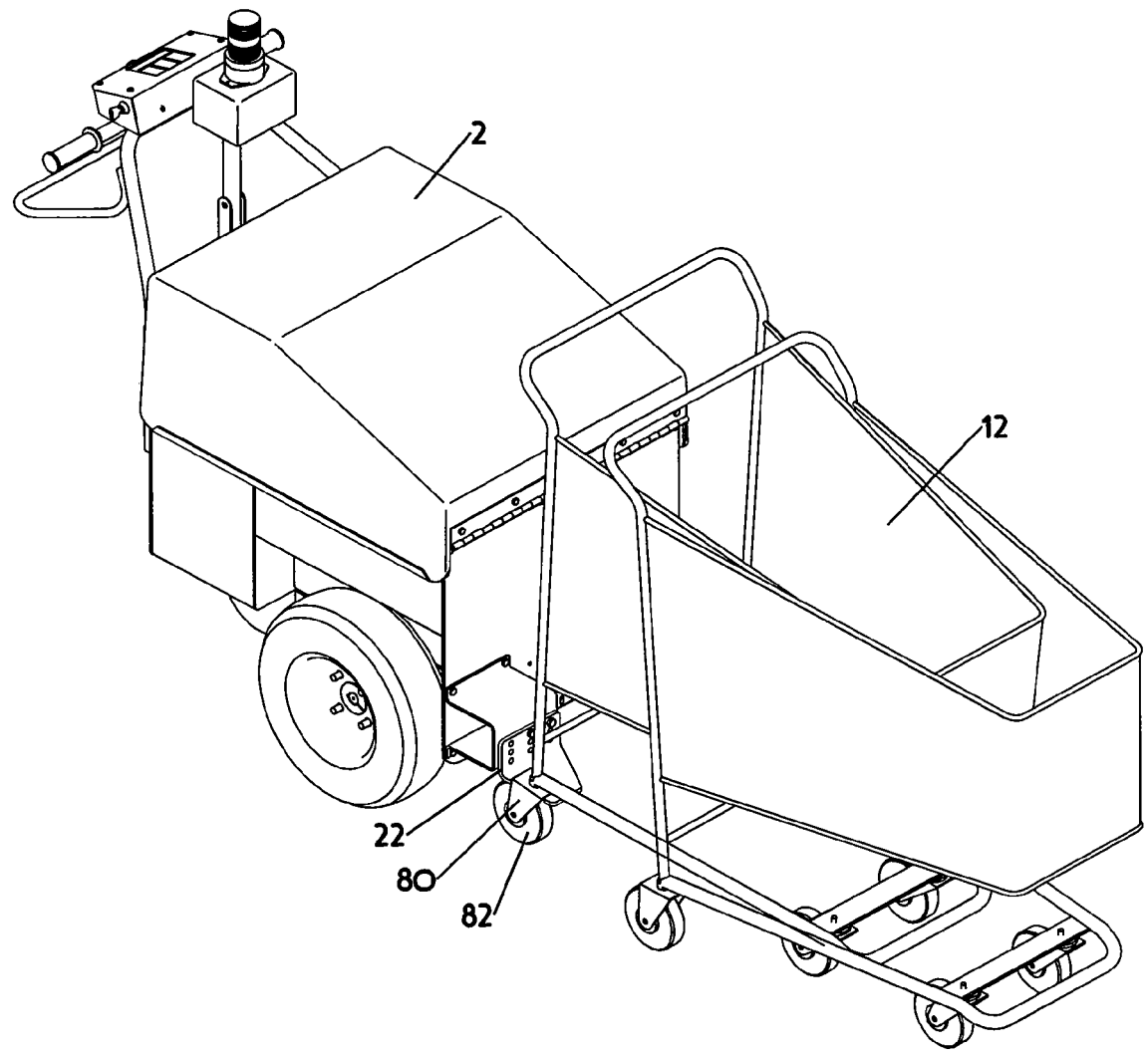
FIG. 7A is a perspective view of the front end of the retriever attached to a shopping cart at the rear wheel fork members via an outward capture configuration of the improved cart coupler assembly.
Figure 7B:
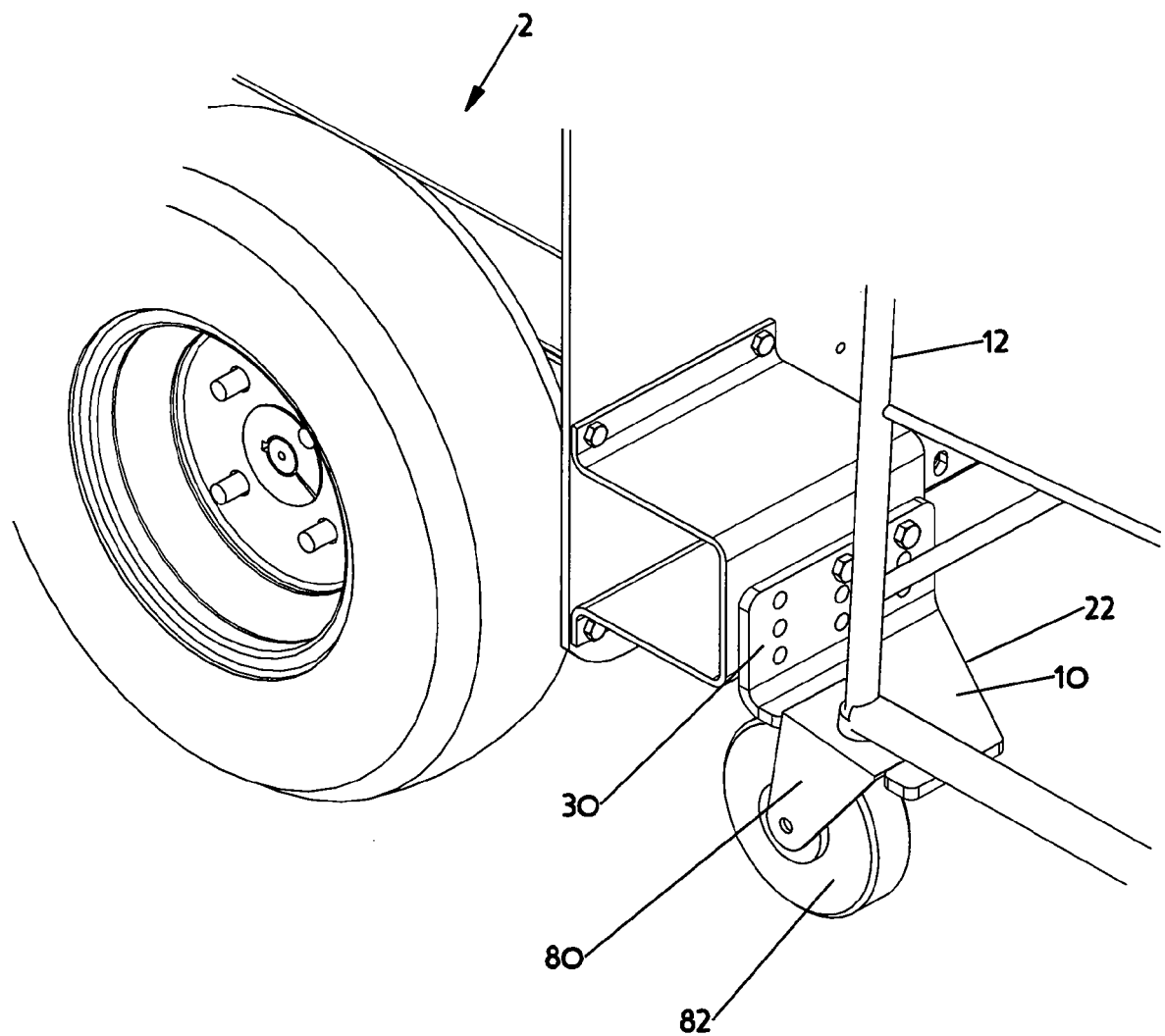
FIG. 7B is an enlarged view of the coupler assembly connecting to the shopping cart as depicted in FIG. 7A.
Figure 7C:
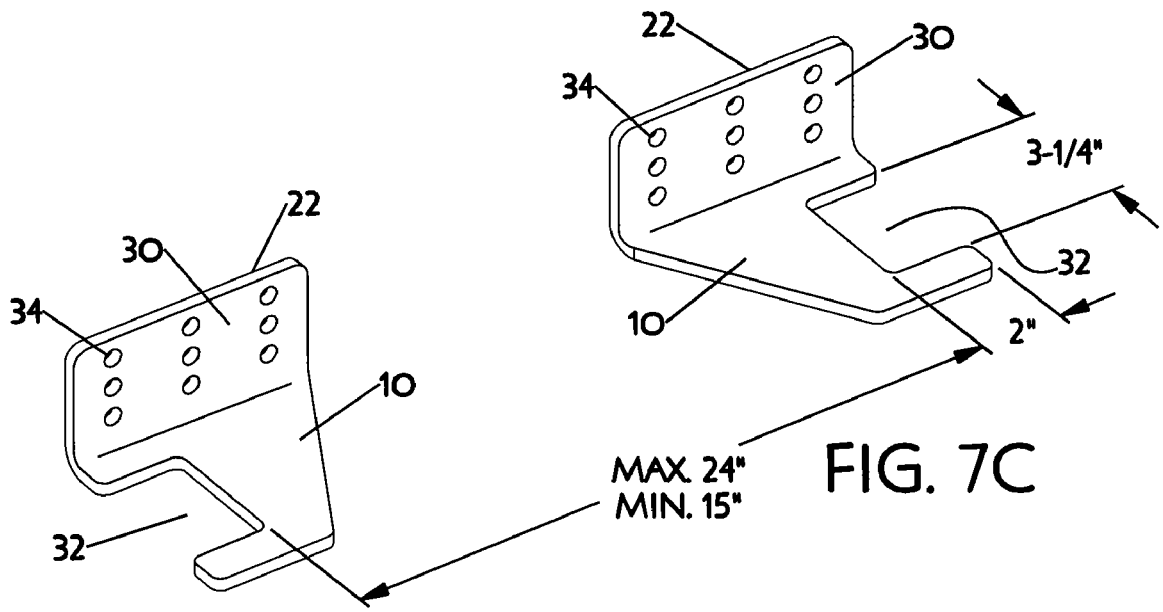
FIG. 7C is a perspective view of the yoke assemblies used in the embodiment depicted in FIGS. 7A-7B.
Figure 7D:
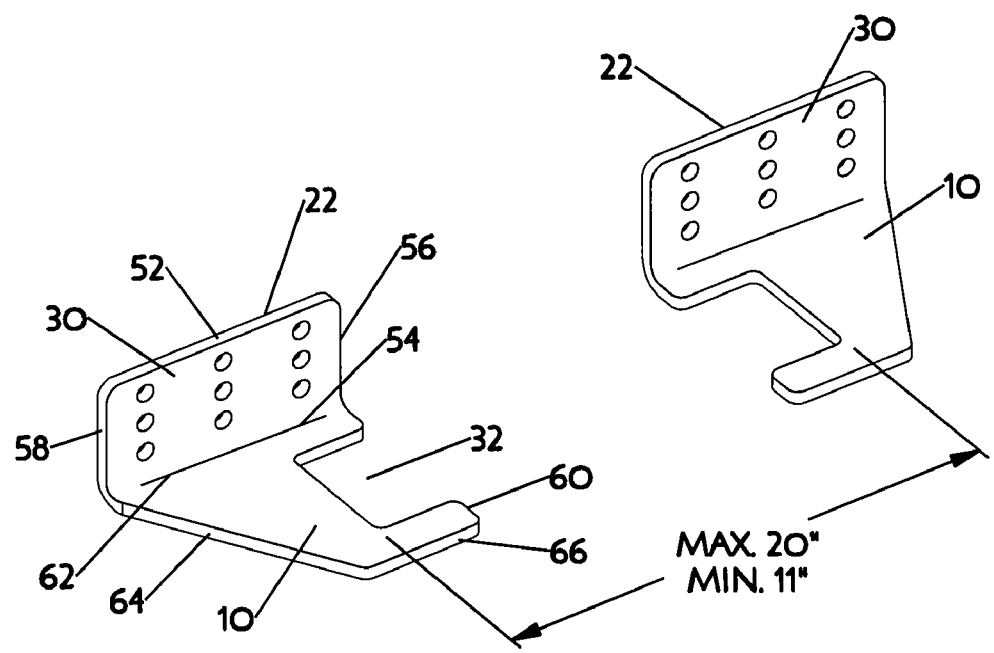
FIG. 7D is a perspective view of another embodiment of the yoke assemblies depicted in FIGS. 7A-7B.
Figure 7E:
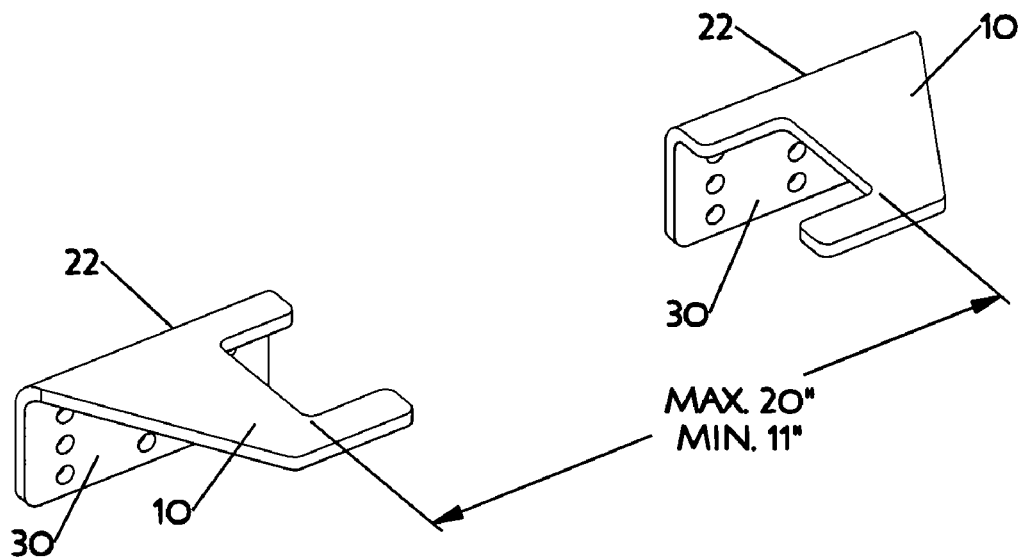
FIG. 7E is a perspective view of another embodiment of the yoke assemblies depicted in FIGS. 7A-7B.

The cart coupler assembly 4 can be configured to utilize alternative yoke embodiments 22 with larger or smaller slots 32 having different shapes than previously discussed. An alternatively shaped slot 32 can allow the operator to connect the cart coupler assembly 4 to the first shopping cart 12 in locations other than the vertical rear support members 14. Such an alternative slot 32 is depicted in FIGS. 7A-7G. FIG. 7A is a perspective view of the front end 6 of the retriever 2 attached to a shopping cart 12 at the fork member 80 of the rear wheel 82 via an outward capture configuration of the improved cart coupler assembly 4. FIG. 7B is an enlarged view of the coupler assembly 4 connecting to the shopping cart 12 as depicted in FIG. 7A. FIG. 7C is a perspective view of the yoke assemblies 22 used in the embodiment depicted in FIGS. 7A-7B. FIGS. 7D-7E are perspective views of other embodiments of the yoke assemblies 22 depicted in FIGS. 7A-7B.

As shown in FIGS. 7A-7B, the cart coupler assembly 4 is configured with yokes 22 that allow the operator to use the actuator 20 to connect the cart coupler assembly 4 with rear wheel fork members 80 of the first shopping cart 12. Although the cart coupler assembly 4 is configured in the outward capture configuration, the right yoke 22 and left yoke 22 positions can be swapped to configure the cart coupler assembly 4 in the inward capture configuration. When the yokes 22 are configured in the inward capture or outward capture configuration, U-pins 40 are not required. Alternative yoke embodiments 22 also allow the cart coupler assembly 4 to be configured to connect with the rear wheel fork members 80 in the side engagement configuration.

As depicted in FIGS. 7C-7E, various alternative slot designs can be utilized to allow cart coupler assembly connection with the rear wheel fork members 80 of the first shopping cart 12. For example, the slots 32 on the yokes 22 shown in FIGS. 7C-7E are defined by rectangular cut-outs as opposed to the open angle shape previously discussed in reference to the embodiments depicted in FIGS. 5C-5D and 6C-6D.

As can be understood from FIGS. 7C-7E, the yokes 22 depicted in FIGS. 7C-7E have the same mounting portions as described with respect to FIGS. 5C-5D and 6C-6D, but have different jaw portions 10. Referring now to the right yoke 22 of FIG. 7C and the left yoke 22 of FIG. 7D, the first edge 60, the second edge 62, the third edge 64, and the fourth edge 66 of the jaw portion 10 define a quadrilateral. The first edge 60 is connected with the second edge 62 and the fourth edge 66 generally at right angles. The fourth edge 66 is shorter than and parallel to the second edge 62. The third edge 64 is connected with the second edge 62 and the fourth edge 66. The slot 32 is rectangular in shape with the shorter edges of the rectangular shape extending into the jaw portion 10 from the first edge 60. The second edge 62 of the jaw portion 10 is connected with the bottom edge 54 of the mounting portion 30. As shown in FIG. 7C, the left yoke 22 of FIG. 7C is a mirror image of the right yoke 22. Similarly, as shown in FIG. 7D, the right yoke 22 of FIG. 7D is a mirror image of the left yoke 22.

Figure 7F:
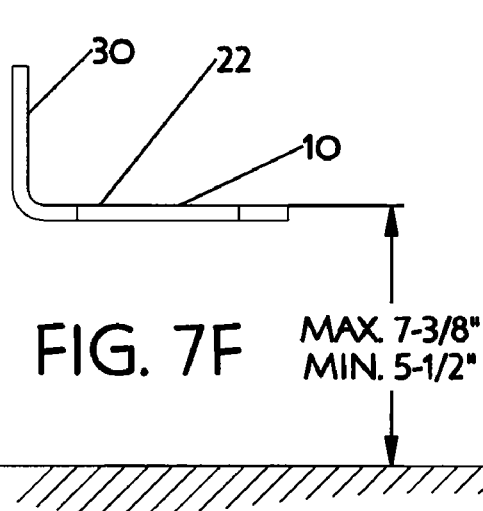
FIG. 7F is a side elevation of the yokes of FIGS. 7C-7D as viewed from the second and left edges of the left yoke.
Figure 7G:
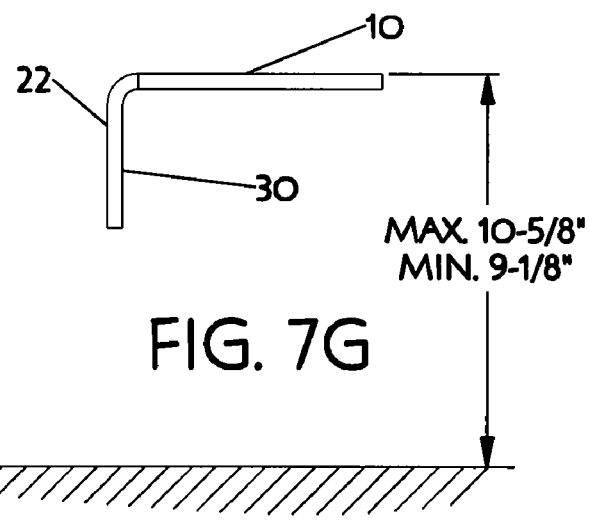
FIG. 7G is a side elevation of the yokes of FIG. 7E as viewed from the second and left edges of the left yoke.

The plurality of mounting holes 34 on the yokes 22 shown in FIGS. 7C-7E are arranged in the same manner as the mounting holes 34 shown in FIGS. 5C-5D and 6C-6D, but other mounting hole arrangements can be utilized. As illustrated in FIG. 7E, the yokes 22 may also be inverted for additional positions to adapt to various shapes of different shopping carts 12. In alternative designs, the jaw portion 10 is connected with top edge 52 of the mounting portion 30. Preferred dimensions are indicated in FIGS. 7F-7G, which are, respectively, a side elevation of the yokes 22 of FIGS. 7C-7D as viewed from the third and left edges 64, 58 of the left yoke 22, and a side elevation of the yokes 22 of FIG. 7E as viewed from the third and left edges 64, 58 of the left yoke 22.

Figure 8A:
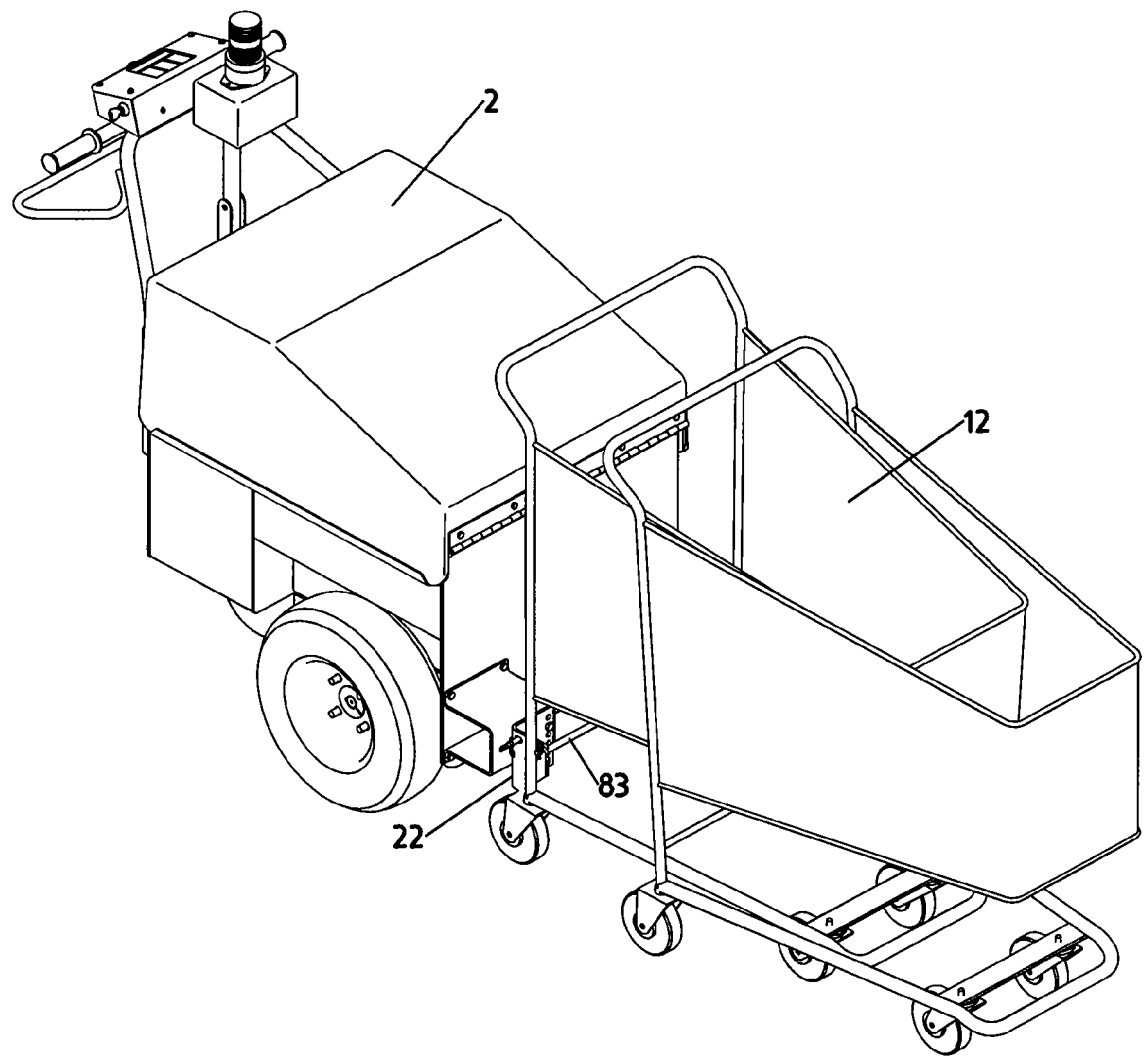
FIG. 8A is a perspective view of the front end of the retriever attached to a shopping cart via a drop-in configuration of the improved cart coupler assembly.
Figure 8B:
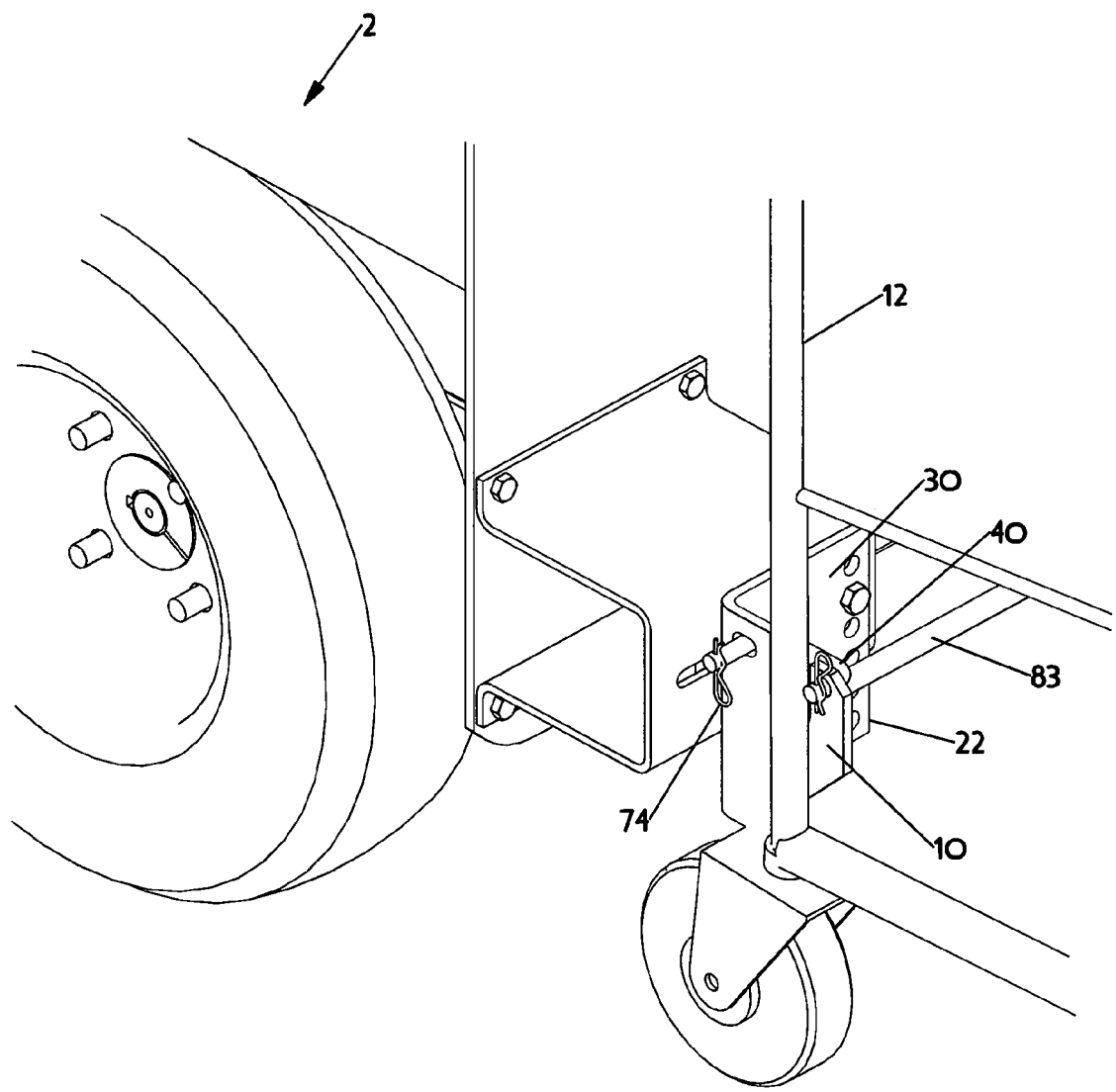
FIG. 8B is an enlarged view of the coupler assembly connecting to the shopping cart as depicted in FIG. 8A.

For a discussion of another embodiment of the improved cart coupler assembly 4, reference is now made to FIGS. 8A-8E. FIG. 8A is a perspective view of the front end 6 of the retriever 2 attached to a shopping cart 12 via a drop-in configuration of the improved cart coupler assembly 4. FIG. 8B is an enlarged view of the coupler assembly 4 connecting to the shopping cart 12 as depicted in FIG. 8A. FIG. 8C is a perspective view of the yoke assemblies 22 used in the embodiment depicted in FIGS. 8A-8B. FIGS. 8D is a perspective view of another embodiment of the yoke assemblies 22 depicted in FIGS. 8A-8B. FIG. 8E is a side elevation view of the yoke assemblies 22 depicted in FIGS. 8C-8D.

As can be understood from FIGS. 8A-8B, the right yoke 22 and the left yoke 22 are connected with cart coupler assembly 4 such that the jaw portions 10 are generally perpendicular to the retriever travel surface (e.g., the parking lot surface) with the slots 32 opening upward when engaged with the first shopping cart 12. The jaw portions 10 partly surround a horizontal rear frame member 83 of the first shopping cart 12. The yokes 22 can also be fixedly connected with the retriever 2. Alternatively, the yokes 22 can be connected with actuators 20 having extension members 24, 26 that allow the operator to easily adjust the yoke heights. Other actuators 20 allow the operator to adjust the yoke height as well as the horizontal positions.

To connect the first shopping cart 12 to the retriever 2 via the cart coupler assembly 4 arranged in the drop-in configuration, the operator lifts the rear of the first shopping cart 12 and places the horizontal rear frame member 83 into the vertically oriented slots 32 on the right yoke 12 and the left yoke 12. If the cart coupler assembly 4 is equipped with the actuator 20, the operator uses the actuator 20 to lower the right yoke 22 and the left yoke 22 to positions such that the slots 32 are lower relative to the retriever travel surface than the horizontal rear frame member 83 of the first shopping cart 12. The first shopping cart 12 is then placed into position relative to the retriever 2 so that the horizontal rear frame member 83 is located just above of each slot 32. The operator then uses the actuator 20 to move the right yoke 22 and the left yoke 22 upward until the slots 32 located in the jaw portions 10 engage the horizontal rear frame member 83 of the first shopping cart 12. In other embodiments, the operator can move the yokes 22 to the right and left along the horizontal rear frame member 83 in order to balance the first shopping cart 12 appropriately. With other yoke embodiments 12, the operator can install U-pins 40 in the jaw portions 10 across the slots 32 to secure the horizontal rear frame member 83 to the yokes 22.

Various yoke embodiments 22 can be utilized to configure the cart coupler assembly 4 in the drop-in configuration to connect with the horizontal rear support member 83 of the first shopping cart 12. For example, as shown in FIGS. 8C-8E, the right edge 56, the top edge 52, the left edge 58, and the bottom edge 54 are connected at generally right angles to define a generally square shaped mounting portion 30. The first edge 60 of the jaw portion 10 is connected with the second edge 62 and the fourth edge 66 generally at right angles. The third edge 64 is connected with the second edge 62 generally at a right angle, and a fifth edge 68 is connected with the third edge 64 and the fourth edge 66. The slot 32 is U-shaped and extends into the middle of the jaw portion 10 from the first edge 60. For the left yoke 22 in FIG. 8D and the right yoke 22 in FIG. 8C, the second edge 62 of the jaw portion 10 is connected with the right edge 56 of the mounting portion 30. The right yoke 22 in FIG. 8D is a mirror image of the left yoke 22 in FIG. 8D, and the left yoke 22 of FIG. 8C is a mirror image of the right yoke 22 of FIG. 8C.

Although other configurations can be utilized, the plurality of mounting holes 34 in the mounting portions 30 shown in FIGS. 8C-8D are arranged in two vertical rows of six holes 34 nearly spanning the length of the right and left edges of the mounting portions 30. As illustrated in FIGS. 8C-8E, pinholes 70 are also located on each edge of the U-shaped slot 32 in the jaw portions 10. Other embodiments utilize alternative mounting hole 34 and pin hole 70 arrangements. The locations of the plurality of mounting holes 34 allow the yokes 22 to be connected with the cart coupler assembly 4 to accommodate varying side to side spacing and mounting heights for different shopping carts 12.

Depending upon the sizing requirements for a particular retriever 2 and shopping cart 12, the left yoke 22 of FIG. 8D can be used in combination with the right yoke 22 of FIG. 8C, or the right yoke 22 of FIG. 8D can be used with the left yoke 22 of FIG. 8C. Preferred dimensions are shown in FIGS. 8C-8E that correspond to the particular yoke embodiments 22 depicted therein.

Figure 9A:
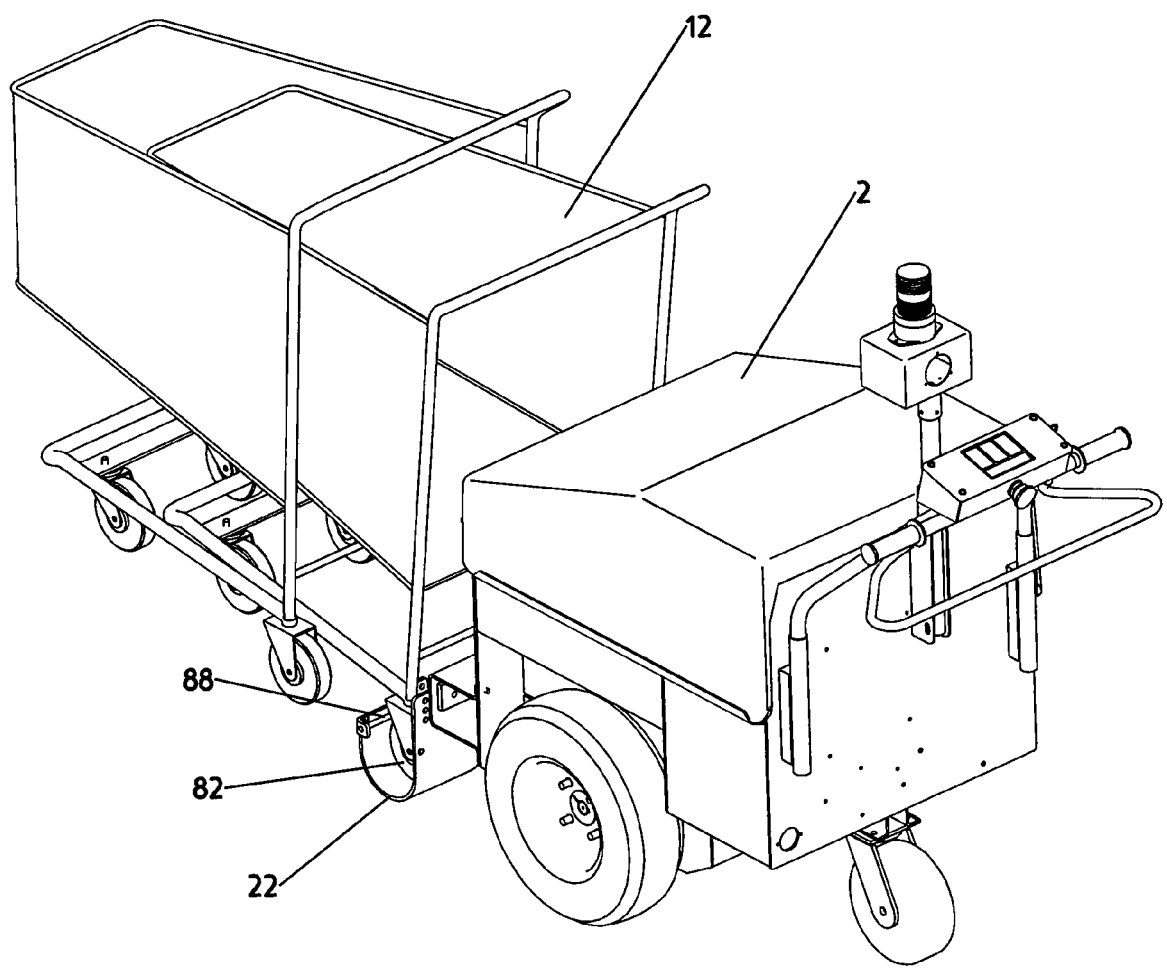
FIG. 9A is a perspective view of the rear end of the retriever wherein the retriever is attached to a shopping cart via a U-shaped jaw configuration of the improved cart coupler assembly.
Figure 9B:
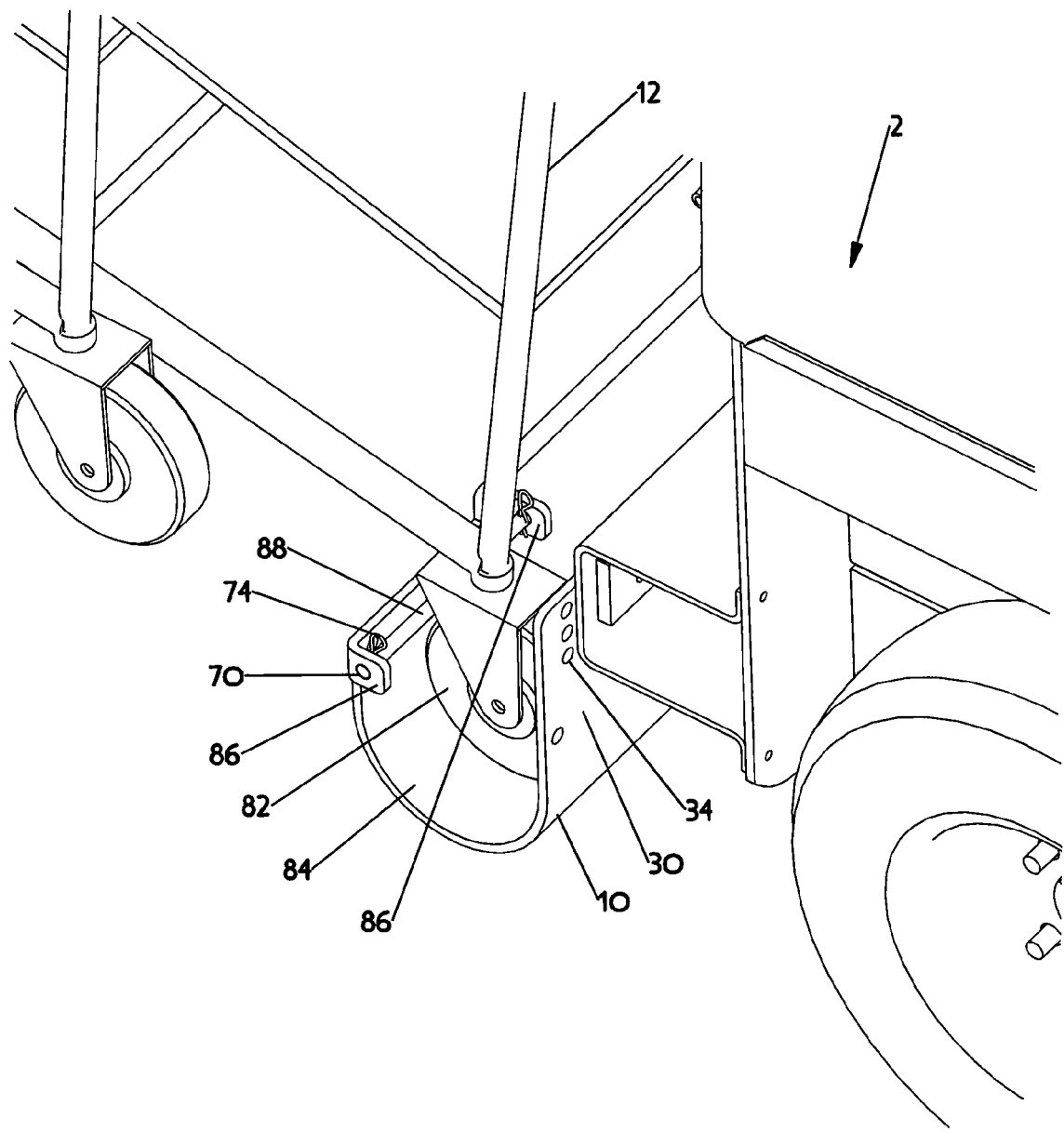
FIG. 9B is an enlarged view of the coupler assembly connecting to the shopping cart as depicted in FIG. 9A.
Figure 9C:
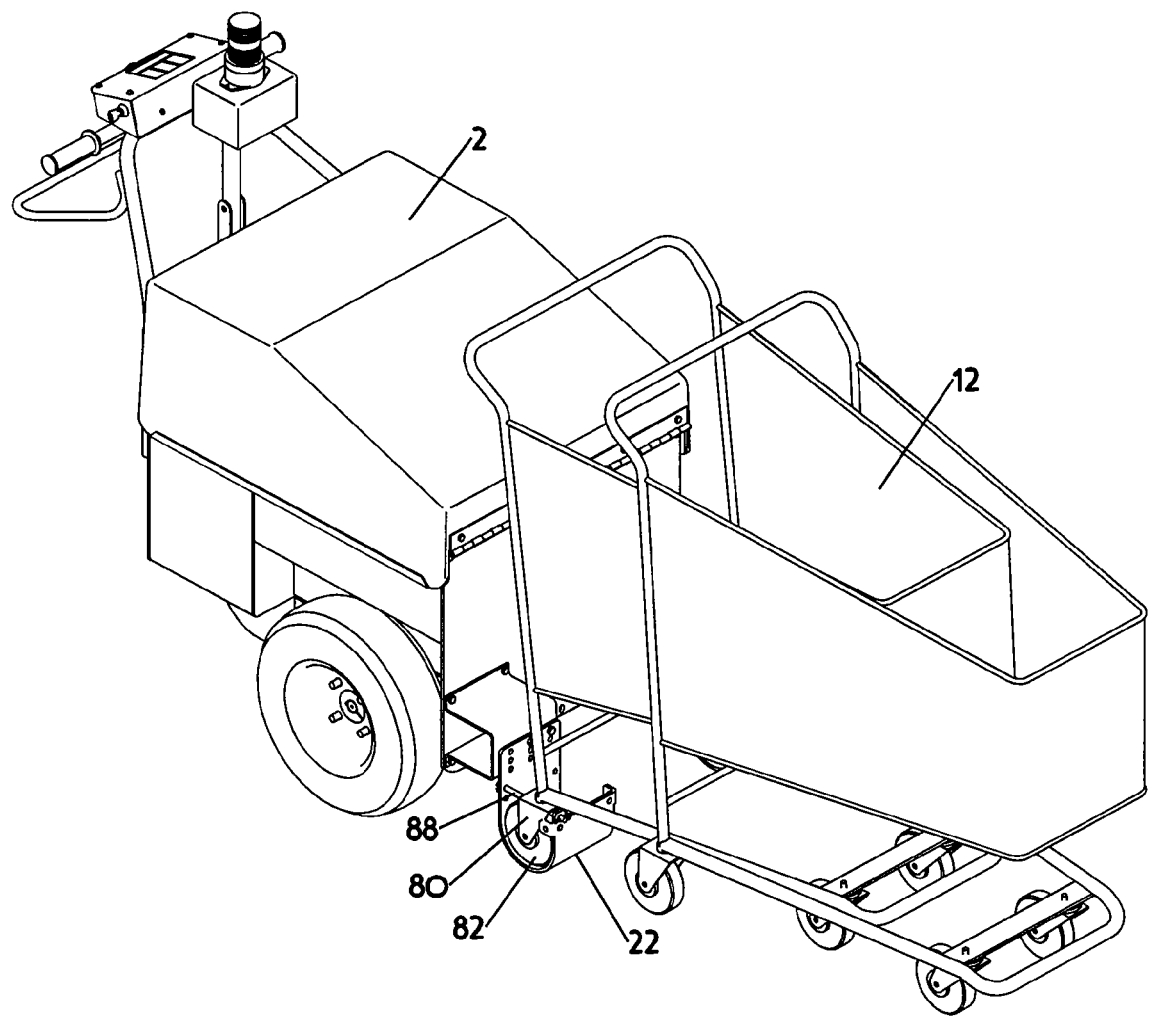
FIG. 9C is a perspective view of the front end 6 of the retriever attached to the shopping cart via a variation of the U-shaped jaw configuration depicted in FIGS. 9A-9B.
Figure 9D:
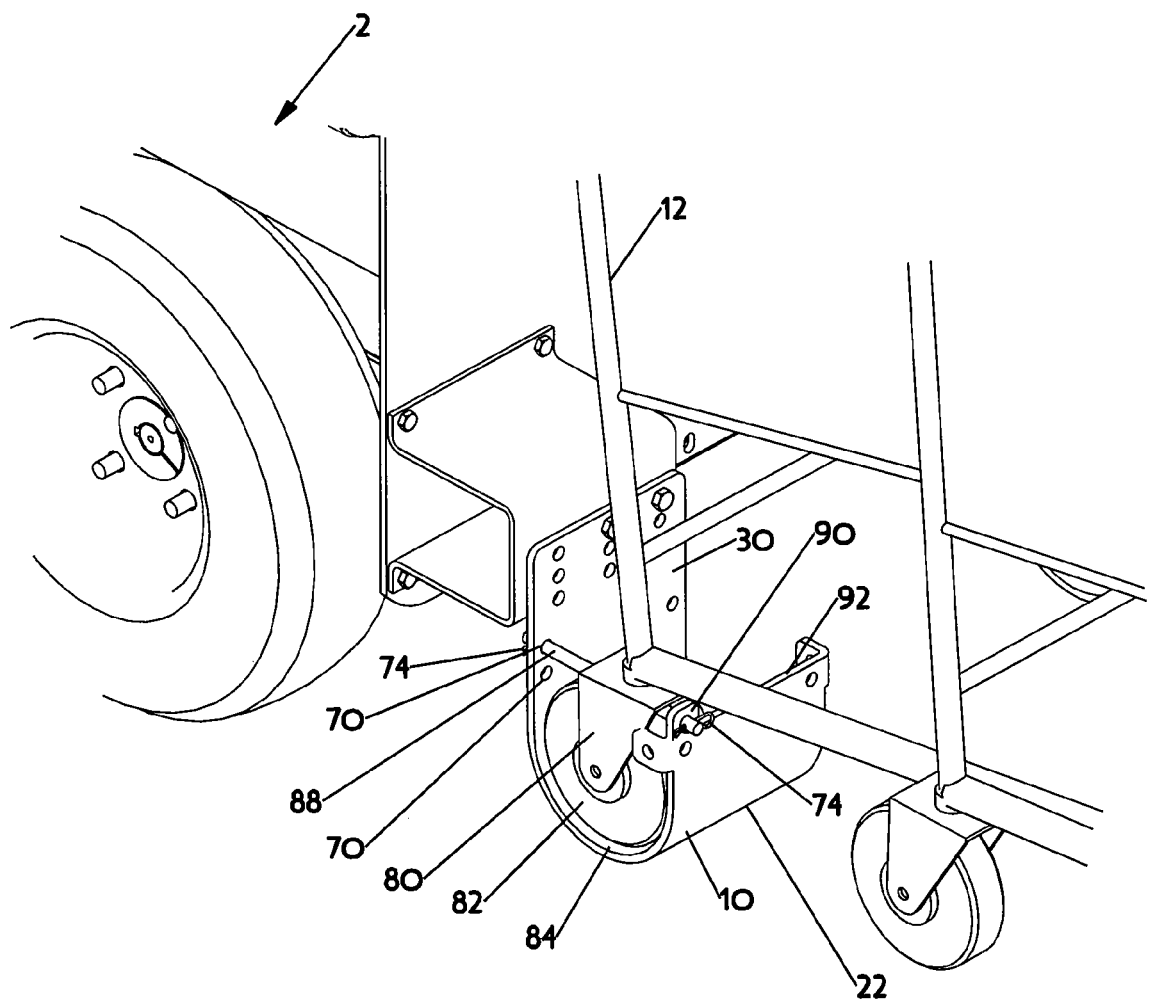
FIG. 9D is an enlarged view of the coupler assembly connecting to the shopping cart as depicted in FIG. 9C.

For a discussion of other embodiments of the improved cart coupler assembly 4, reference is now made to FIGS. 9A-9E. FIG. 9A is a perspective view of the rear end of the retriever 2 wherein the retriever 2 is attached to a shopping cart 12 via a U-shaped jaw configuration of the improved cart coupler assembly 4. FIG. 9B is an enlarged view of the coupler assembly 4 connecting to the shopping cart 12 as depicted in FIG. 9A. FIG. 9C is a perspective view of the front end 6 of the retriever 2 attached to the shopping cart 12 via a variation of the U-shaped jaw configuration depicted in FIGS. 9A-9B. FIG. 9D is an enlarged view of the coupler assembly 4 connecting to the shopping cart 12 as depicted in FIG. 9C.

As depicted in FIGS. 9A-9D, the jaw portion 10 of the right yoke 22 does not utilized slots 32 to connect with the first shopping cart 12. Instead, the jaw portion 10 itself is U-shaped. When connected to the cart coupler assembly 4, the mounting portion 30 extends downward until connecting with the jaw portion 10, which extends forward from the mounting portion 30 and has a concave surface 84 facing upward. A right pin tab 86 and a left pin tab 86 extend rearward from an end region of the jaw portion 10 toward the mounting portion 30. Pinholes 70 are located in the right pin tab 86 and the left pin tab 86. The right yoke 12 is bolted to the cart coupler assembly 4 through at least one of the plurality of mounting holes 34 located in the mounting portion 30. The left yoke 22 (not shown) is a mirror image of the right yoke 22.

As shown in FIGS. 9A-9B, the first shopping cart 12 is connected with the cart coupler assembly 4 by first resting the rear wheels 82 of the first shopping cart 12 on the concave surface 84 of the jaw portion 10 of the right yoke 22 and the left yoke 22. A locking pin 88 is then inserted through the pinholes 70 in the pin tabs 86. As shown in FIG. 9B, the locking pin 88 is generally cylindrical in shape and has clip holes located at both end regions. Once the locking pin 88 is installed in the pinholes 70, the clip holes are located just inside of each pin tab 86. Alternatively, the clip holes can be located just outside of each pin tab 86. Clips 74 are then inserted into each clip hole to hold the locking pin 88 in position. As shown in FIG. 9B, the distance between the locking pin 88 and the mounting portion 30 of the yoke 22 is less than the outer diameter of the rear wheel 82 of the shopping cart 12, which prevents the rear wheel 82 from lifting out of the jaw portion 10 when the retriever 2 is in use.

As shown in FIGS. 9C-9D, in one embodiment, the concaved-shaped yokes 22 are also provided with a vertical pin tab 90 that extends upward off of the front upper edge 92 of the concaved-shaped yokes 22. The pinhole 70 located in the vertical pin tab 90 is located directly in front of a corresponding pinhole 70 located in the mounting portion 30. In this embodiment, the first shopping cart 12 is connected with the cart coupler assembly 4 by first resting the rear wheels 82 of the first shopping cart 12 on the concave 84 surface of the jaw portion 10 of the right yoke 22 and the left yoke 22. The locking pin 88 is then inserted through the pinhole 70 in the vertical pin tab 90, through space between the top of the rear wheel 82 and the rear wheel fork member 80, and through the pinhole 70 in the mounting portion 30.

As shown in FIGS. 9D, the locking pin 88 is generally cylindrical in shape and has clip holes located at both end regions. Once the locking pin 88 is installed in the pinholes 70, the clip holes are located to the rear of the mounting portion 30 and to the front of the vertical pin tab 90. Alternatively, the clip holes can be located just inside of the mounting portion 30 and the vertical pin tab 90. Clips 74 are inserted into each clip hole to hold the locking pin 88 in position. As can be understood from FIGS. 9C-9D, because the locking pin 88 is inserted between the rear wheel 82 and the rear wheel fork member 80 of the first shopping cart 12, the rear wheel 82 is prevented from lifting out of the jaw portion 10 or moving from side to side when the retriever 2 is in use. Additional pinholes 70 are located in the end region of the jaw portion 10 along with corresponding pinholes 70 in the mounting portion 30 to accommodate various rear wheel sizes and configurations. While FIGS. 9C-9D depict a yoke 22 equipped with both types of pin tabs 86, 90 to provide flexibility in possible attachment configurations, other embodiments will be equipped with one type of pin tab 90 or the other type of pin tab 86.

Figure 9F:
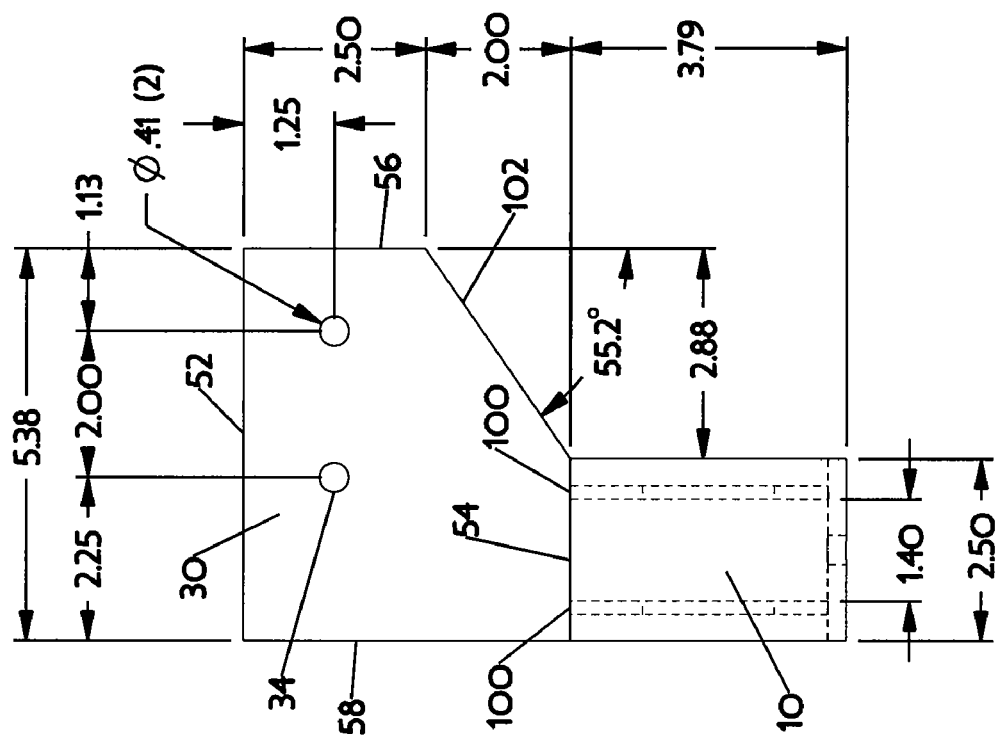
FIG. 9F is a front elevation of the yoke depicted in FIG. 9E.
Figure 9E:
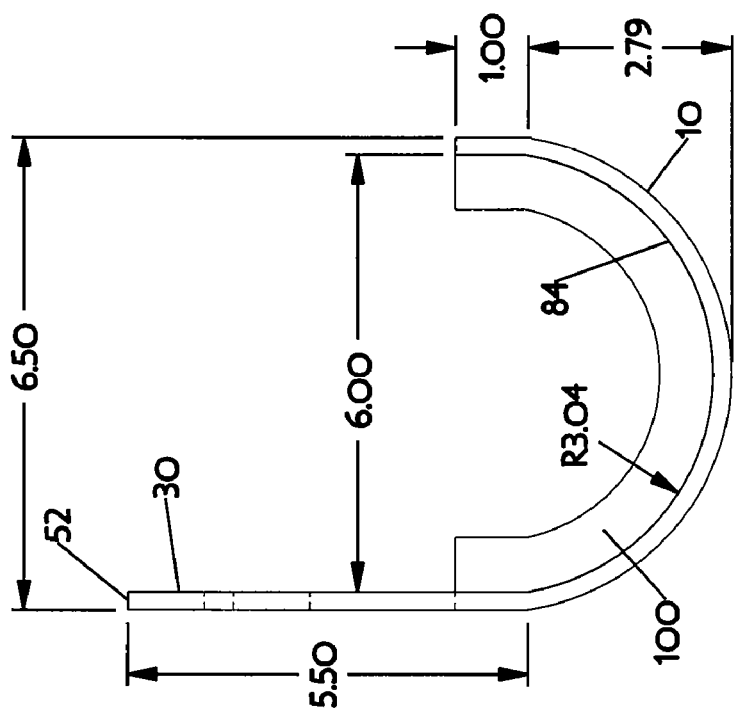
FIG. 9E is a side elevation of a concaved-shaped (i.e., U-shaped) yoke as depicted in FIGS. 9A-9B.
Figure 9G:
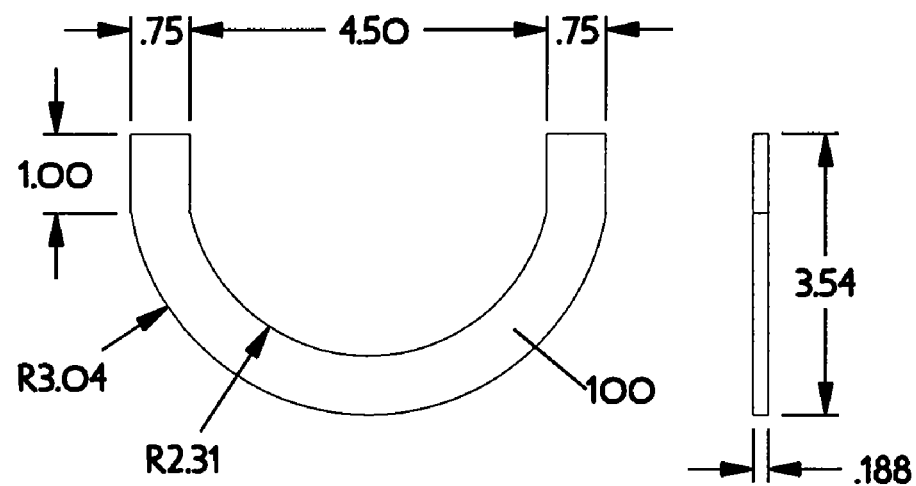
FIG. 9G is an enlarged side elevation of a flange forming part of the yoke depicted in FIG. 9E.
Figure 9H:
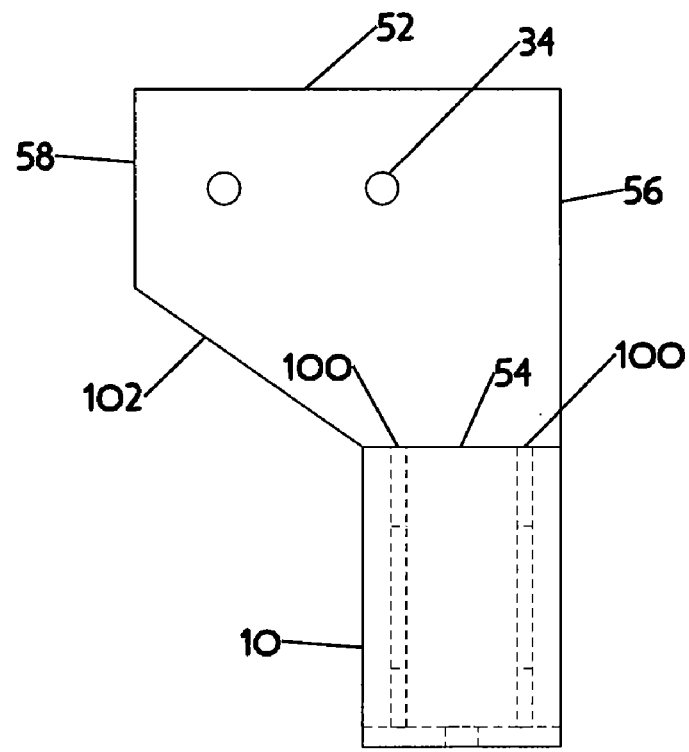
FIG. 9H is a front elevation of another version of the yoke depicted in FIG. 9E.

Various yoke embodiments 22 can be utilized to configure the cart coupler assembly 4 to connect with the rear wheels 82 of the first shopping cart 12 as shown in FIGS. 9A-9D. For a discussion of these various embodiments, reference is now made to FIGS. 9E-9J. FIG. 9E is a side elevation of a concaved-shaped (i.e., U-shaped) yoke 22 as depicted in FIGS. 9A-9B. FIG. 9F is a front elevation of the yoke 22 depicted in FIG. 9E. FIG. 9G is an enlarged side elevation of a flange 100 forming part of the yoke 22 depicted in FIG. 9E. FIG. 9H is a front elevation of another version of the yoke 22 depicted in FIG. 9E.

As illustrated in FIGS. 9E-9F, on the mounting portion 30 of the yoke 22, the top edge 52 is connected with the right edge 56 and the left edge 58 generally at right angles, the bottom edge 54 is connected with the left edge 58 generally at right angles, and the bottom edge 54 is connected with the right edge 56 via an angled edge 102. Two mounting holes 34 are also located in the mounting portion 30. A right flange 100 and a left flange 100 are also connected with the concave surface 84 of the jaw portion 10. The right and left flanges 100 conform to the curvature of the jaw portion 10 such that each flange 100 is constantly normal to the upper surface of the jaw portion 10. When in use, the rear wheels 82 of the first shopping cart 12 rest on the concave surface 84 of the jaw portion 10 between the right flange 100 and the left flange 100. The yoke 22 depicted in FIG. 9H is a mirror image of the yoke 22 depicted in FIG. 9F. Preferred dimensions are also shown in FIGS. 9E-9H that correspond to the particular yoke embodiments 22 depicted therein.

In one embodiment, the cart coupler assembly 4 may employ both of the yokes 22 depicted in FIGS. 9F and 9H. In another embodiment, the cart coupler 4 may employ two yokes 22 as depicted in FIG. 9F. In another embodiment, the cart coupler 4 may employ two yokes 22 as depicted in FIG. 9H. Preferred dimensions are shown in FIGS. 9E-9H that correspond to the particular yoke embodiments 22 depicted therein.

In one embodiment, the concave surfaces 84 of the yokes 22 are brought into engagement with the outer circumferential surfaces of the wheels 82 by lifting the shopping cart upwards to clear the yokes 22 and then lowering the wheels 82 into the yokes 22. In another embodiment, the concave surfaces 84 of the yokes 22 are brought into engagement with the outer circumferential surfaces of the wheels 82 by tipping the yokes forward so as to scoop the wheels 82 into the concave surfaces 84. In another embodiment, the concave surfaces 84 of the yokes 22 are brought into engagement with the outer circumferential surfaces of the wheels 82 by placing the yokes 22 adjacent the wheels 82 and then displacing the yokes 22 axially towards the wheels 22 such that the wheels 22 slide over the exterior edges of the yokes 22 and onto the concave surfaces 84. This can be done by placing the yokes 22 between the rearward wheels 82 and diverging the yokes 22 outwardly toward the wheels 82 and away from each other. Alternatively, the yokes 22 can be placed adjacent the outside sides of the wheels 82 and then converged towards the each other and the wheels 82.

As those skilled in the art will realize, all of the yoke embodiments 22 previously described can be arranged on the cart coupler assembly 4 in any number of configurations, and are not limited what is depicted herein. For example, the yoke embodiments 22 previously described with reference to FIGS. 3A-7G can be connected with the cart coupler assembly 4 such that slots 32 are vertically oriented, facing either up or down, to engage a horizontal frame member 83 of the first shopping cart 12. In addition, the yoke embodiments 22 described with reference to FIGS. 8A-8E can be connected with the cart coupler assembly 4 so that the vertically oriented slots 32 are facing down to engage a horizontal frame member 83 of the first shopping cart 12. Alternatively, the yoke embodiments 22 shown in FIGS. 8A-8E can also be connected with the cart coupler assembly 4 in either the inward capture configuration or the outward capture configuration to engage a vertical frame member 14 of the first shopping cart 12. The yoke embodiments 22 described with reference to FIGS. 9A-9H can also be arranged such that the concave jaw surfaces 84 face downward to engage the top portions of the shopping cart wheels 82 when the rear wheel fork 80 comprises a single plate (as opposed to two plates) running between the axle of the wheel 82 and the frame of the shopping cart 12.

As those skilled in the art will realize, each of the previously described embodiments of the coupler assembly can be configured to raise the attached shopping cart 12 such that its rearmost wheels 82 are elevated above the vehicle travel surface.

Other embodiments of the present invention use actuators 20 in various configurations with the yokes 22 described in FIGS. 5A-9H. For example, in one embodiment, the right yoke 22 is fixedly connected with the retriever 2 and the left yoke 22 is connected with the actuator 20. In this configuration, the operator uses the actuator 20 to move the left yoke 22 horizontally to engage and disengage the first shopping cart 12. Alternatively, the left yoke 22 is fixedly connected with the retriever 2 and the right yoke 22 is connected with the actuator 20. In another embodiment, both yokes 22 are connected to the actuator(s) 20. In another embodiment, the actuator 20 has the ability to lift and/or support both rear wheels 82 of the first shopping cart 12 above the retriever travel surface. When the rear wheels 82 of the first shopping cart 12 are suspended above the retriever travel surface, the rear wheels 82 of the first shopping cart do not do not wear and a portion of the weight of the first shopping cart 12 is transferred to drive wheels 91 of the retriever 2. The weight transfer also provides additional steering capability and additional traction to the drive wheels 91 of the retriever 2.

Figure 10A:
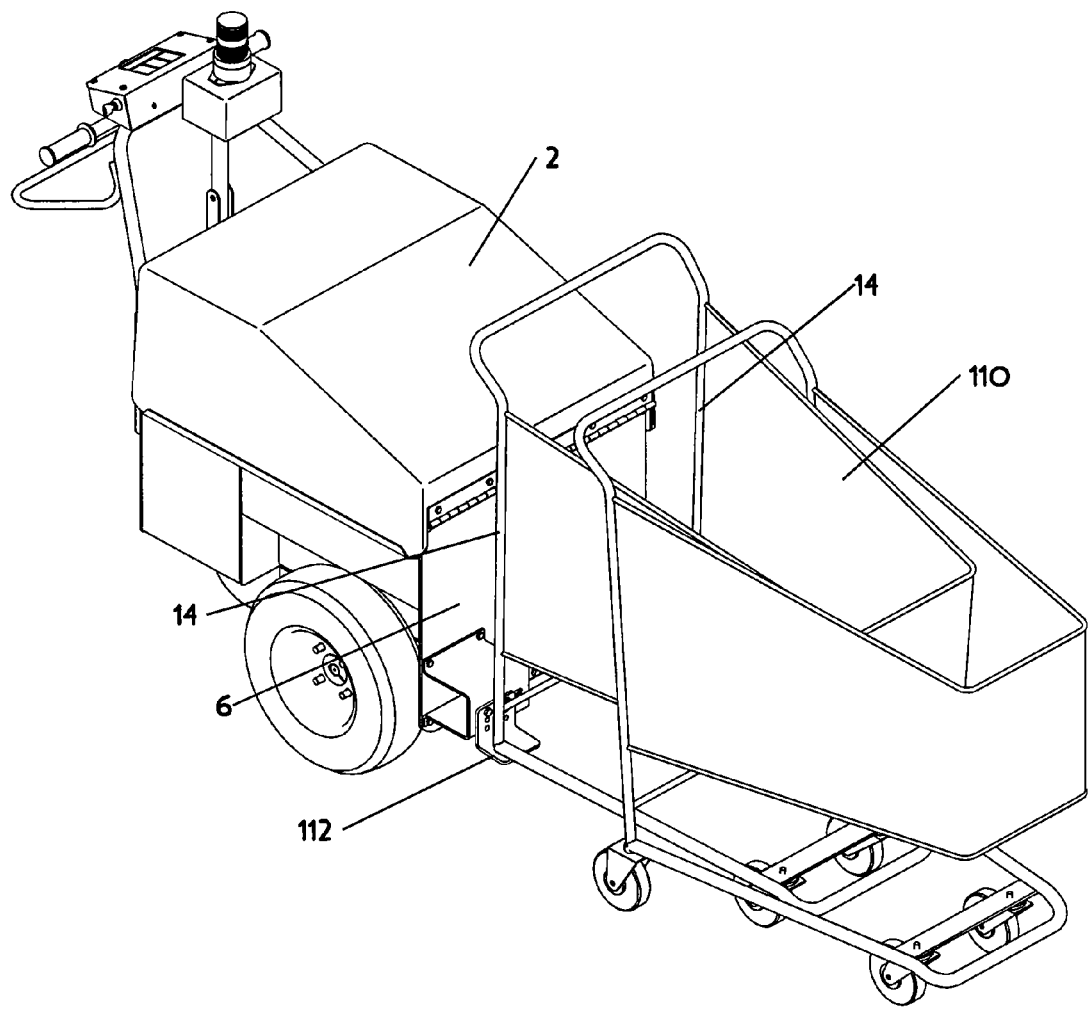
FIG. 10A is a perspective view of the front end of the retriever attached to a shopping cart via a configuration of the improved cart coupler assembly that employs a modified shopping cart attached to the assembly.
Figure 10B:
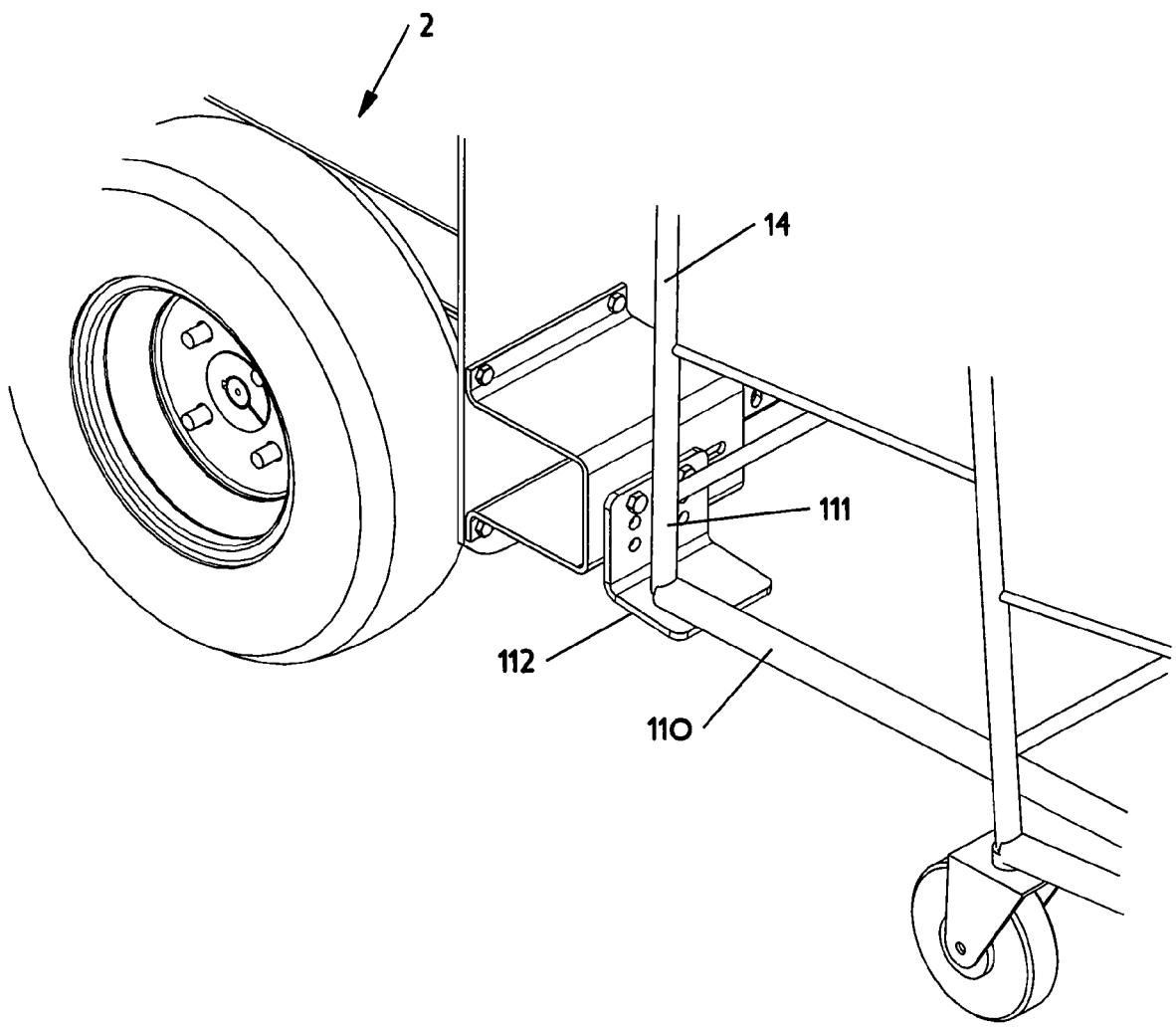
FIG. 10B is an enlarged view of the coupler assembly connecting to the shopping cart as depicted in FIG. 10A.

Other cart coupler assemblies 4 conforming to the present invention do not use yokes 22 to connect the first shopping cart 12 with the retriever 2. For a detailed discussion of such a coupler assembly 4, reference is now made to FIGS. 10A-10B. FIG. 10A is a perspective view of the front end 6 of the retriever 2 attached to a shopping cart 12 via a configuration of the improved cart coupler assembly 4 that employs a modified shopping cart 110 attached to the assembly 4. FIG. 10B is an enlarged view of the coupler assembly 4 connecting to the shopping cart 12 as depicted in FIG. 10A.

As shown in FIGS. 10A-10B, the cart coupler assembly 4 includes a modified shopping cart 110 that is fixedly attached to the front end 6 of the retriever 2. As shown in FIGS. 10A-10B, the rear wheels 82 have been removed from a normally configured shopping cart, and lower regions 111 of the vertical rear frame members 14 are connected to the front 6 of the retriever 2 via brackets 112 located on the retriever 2. The vertical rear frame members 14 can be secured to the brackets 112 by any suitable means, such as welding or bolting. This configuration of the cart coupler assembly 4 provides the ability to lift and support the rear of the modified shopping cart above the ground, which eliminates the need for more than two wheels on the modified shopping cart 110.

In another alternative embodiment of the present invention, the cart coupler assembly 4 is configured to emulate the first shopping cart 12 without the need to attach the full modified shopping cart 12 as depicted in FIGS. 10A-10B. Various versions of such an alternative embodiment is depicted in FIGS. 11A-11G.

Figure 11A:
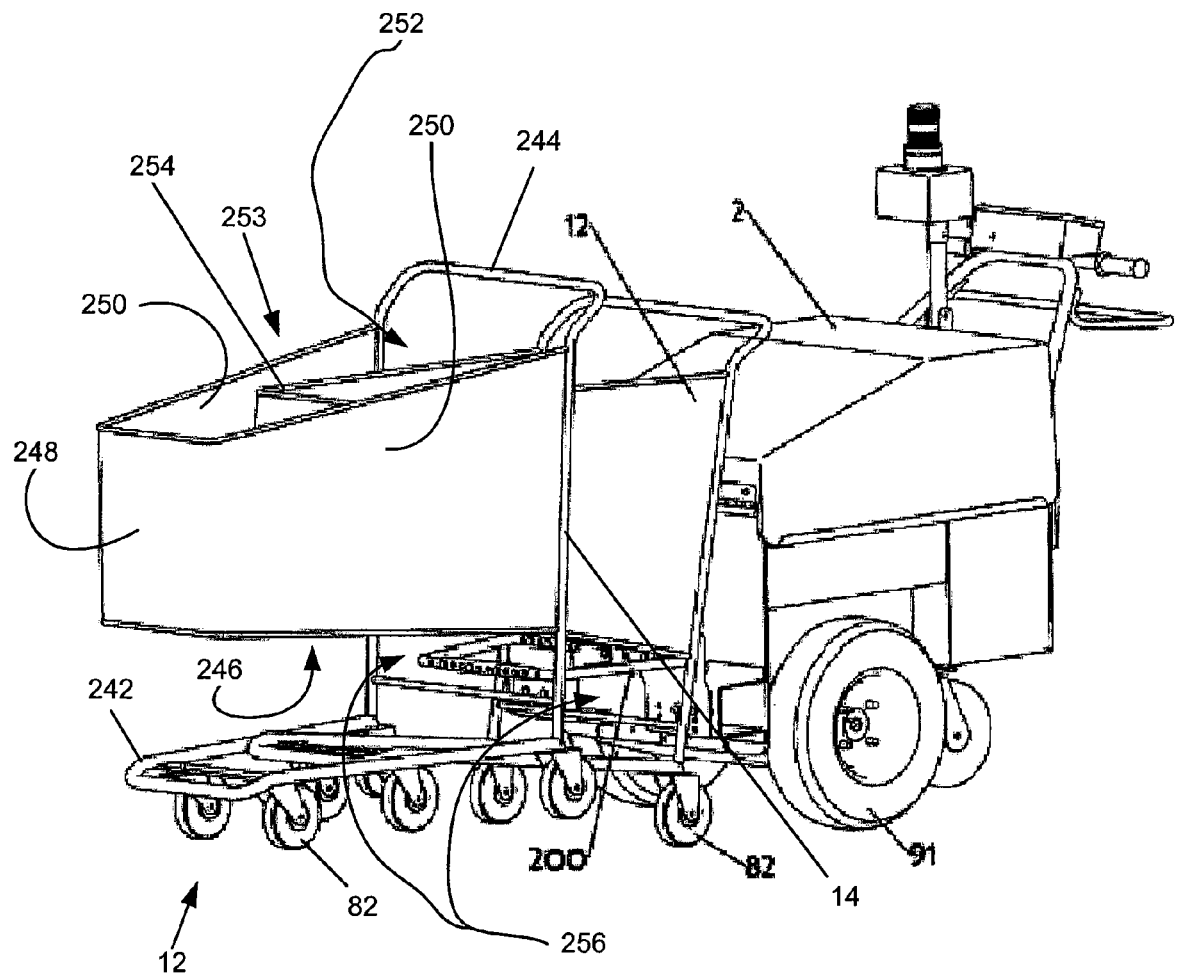
FIG. 11A is a perspective view of the front end of the retriever attached to a shopping cart via a configuration of the improved cart coupler assembly that employs a cart emulator attached to the assembly.
Figure 11B:
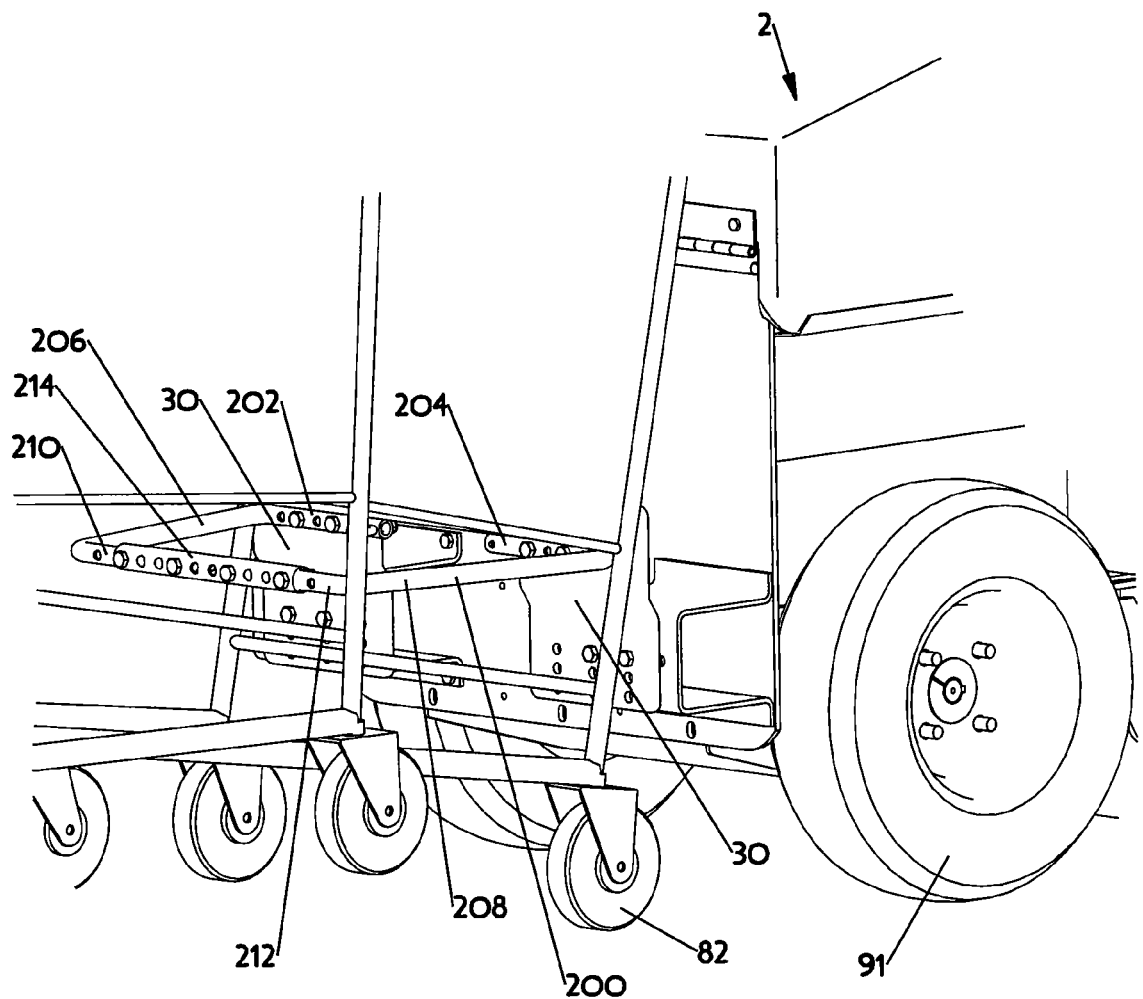
FIG. 11B is an enlarged view of the coupler assembly connecting to the shopping cart as depicted in FIG. 11A.

FIG. 11A is a perspective view of the front end 6 of the retriever 2 attached to a shopping cart 12 via a configuration of the improved cart coupler assembly 4 that employs a cart emulator 200 attached to the assembly 4. FIG. 11B is an enlarged view of the coupler assembly 4 connecting to the shopping cart 12 as depicted in FIG. 11A.

As illustrated in FIG. 11A, the cart emulator 200 of the retriever 2 is engaging a shopping cart 12 of a string of shopping carts 12. The shopping carts 12 are typical to those found in shopping centers throughout the country and include well-known features such as a basket 240 for receiving therein shopping items, a lower frame 242 including a plurality of wheels 82 coupled thereto, and a pair of generally vertical frame members 14 supporting the basket 240 above the lower frame 242 and wheels 82. The frame members 14 transition into a generally horizontal handle 244.

The basket 240 includes a bottom 246, a front wall or side 248, a pair of lateral walls or sides 250, a rear wall or side 252, and an open top 253 defined by the sides 248, 250, 252. The rear side 252 is adapted to receive therein a front end 254 of a basket 240 of another shopping cart 12.

As depicted in FIG. 11A, in one embodiment, the cart emulator 200 engages the shopping cart 12 by being received in a space 256 in the shopping cart 12. The space 256 is defined on the top by the bottom 246 of the basket 240, on the sides by the frame members 14, and on the bottom by the wheels 82 and/or lower frame 242.

As shown in 11A-11B, the cart coupler assembly 4 includes a cart emulator 200 connected with right and left mounting plates 30 secured to the retriever 2. The cart coupler assembly 4 via the emulator 200 emulates a portion of the shape of a shopping cart 12 to allow nesting of the first shopping cart 12 to the front end 6 of the retriever 2. The cart emulator 200 is defined by a left rear member 202, a right rear member 204, a left member 206, a right member 208, a forward left member 210, a forward right member 212, and a cross member 214. In the cart emulator 200 shown in FIGS. 11A-11B, the left member 206 is connected with the left rear member 202 and the left forward member 210, and the right member 208 is connected with the right rear member 204 and the right forward member 212. The left member 206 and the right member 208 angle toward each other and slope toward the retriever travel surface as they extend forward from the mounting plates 30. The cross member 214 is movably connected with the left forward member 210 and the right forward member 212. As illustrated in FIGS. 11A-11B, the cross member 214 is shaped as a hollow cylindrical tube with an inner diameter large enough to fit around the outer diameters of the right forward member 212 and the left forward member 210 so that the right forward member 212 and the left forward member 210 can slide in and out of the cross member 214.

Generally speaking, the cart emulator 200 can be constructed in various ways to allow its width to be adjusted to accommodate shopping carts 12 of different sizes and shapes. In one embodiment, the width of the emulator 200 is adjusted manually via bolts attaching the forward members 210, 212 to the cross member 214 and bolts attaching the rear members 202, 204 to the mounting plates 30. In another embodiment, the width of the emulator 200 is adjusted automatically via an actuator that causes the mounting plates to displace towards or away from each other laterally relative to the retriever 2. This causes the left and right members 206, 208 to displace towards or away from each other and the front most portions of the forward members 210, 212 to telescope into or out of the cross member 214.

As shown in FIGS. 11A-11B, a plurality of holes is located in the right mounting plate 30, the left mounting plate 30, the right rear member 204, the left rear member 202, the right forward member 212, the left forward member 210 and the cross member 214. The cart emulator 200 is connected with the retriever 2 by bolting or screwing the left rear member 202 to the left mounting plate 30, and the right rear member 204 to the right mounting plate 30 utilizing the corresponding plurality of holes. The cross member 214 is also bolted or screwed to the right forward member 212 and left forward member 210 utilizing the corresponding plurality of holes. The various locations of the plurality of holes in the cart emulator 200 allow a user to adjust the width of the cart emulator 200 by changing the bolt or screw locations. The adjustability of the cart emulator 200 eliminates the problems associated with manufacturing a series of different permanent couplers 4 to fit the multitude of widths and heights of shopping carts 12 used in the marketplace.

In other embodiments, the cart coupler assembly 4 also includes one of the actuator embodiments 20 that utilizes the first and second extension members 24, 26 previously discussed to assist the operator in adjusting the width of the cart emulator 200. In this configuration, the right rear member 204 is connected with the right mounting plate 30, which is connected with the first extension member 24. Similarly, the left rear member 202 is connected with the left mounting plate 30, which is connected with the second extension member 26. Instead of being bolted to the right forward member 212 and the left forward member 210, the cross member 214 is telescopically connected with the right and left forward members 210, 212 to allow the right and left forward members 210, 212 to freely move in and out of the cross member 214. To adjust the width of the cart emulator 200, the operator need only operate the actuator 20 to move the extension members 24, 26 in or out. Other actuators 20 allow the operator to adjust the height of the cart emulator 200 as well.

In another embodiment, the cart coupler assembly 4 has the ability to lift and/or support both rear wheels 82 of the first shopping cart 12 above the retriever travel surface. As previously mentioned, when the rear wheels 82 of the first shopping cart 12 are suspended above the retriever travel surface, the rear wheels 82 of the first shopping cart 12 do not do not wear and a portion of the weight of the first shopping cart 12 is transferred to drive wheels 91 of the retriever 2. The weight transfer also provides additional steering capability and additional traction to the drive wheels 91 of the retriever 2.

As indicated in FIGS. 11A-11B, the first shopping cart is connected with the retriever 2 by inserting the cart emulator 200 between the vertical rear frame members 14 of the first shopping cart 12. The cart coupler assembly members 200 can also be inserted between other components of the first shopping cart 12. The cart emulator 200 extends far enough into the first shopping cart 12 to engage additional structure of the first shopping cart 12. This additional engagement allows the operator to steer the retriever 2 by using the contact of the cart coupler assembly 4 with the first shopping cart 12 so that when the first shopping cart 12 is turned or directed, the retriever 2 will follow. The right and left mounting plates 30 are the contact points where the cart coupler assembly 4 contacts the first shopping cart 12 and thereby transmits pushing forces from the retriever 2 to the first shopping cart 12. The first shopping cart 12 is releasable at any time by pulling the first shopping cart 12 away from the retriever 2.

Figure 11C:
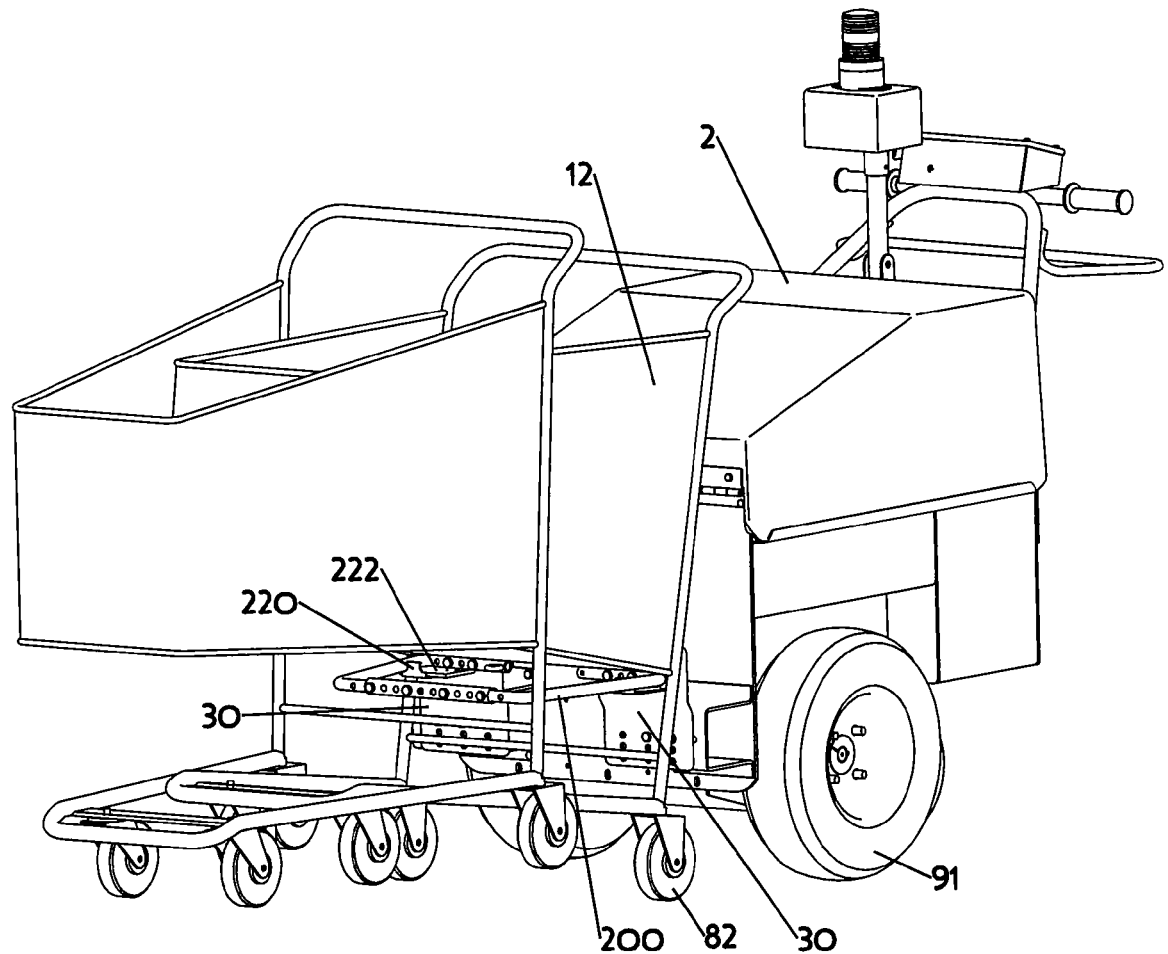
FIG. 11C is a perspective view of the front end of the retriever attached to a shopping cart via a configuration of the improved cart coupler assembly that employs a cart emulator provided with a tooth member.
Figure 11D:
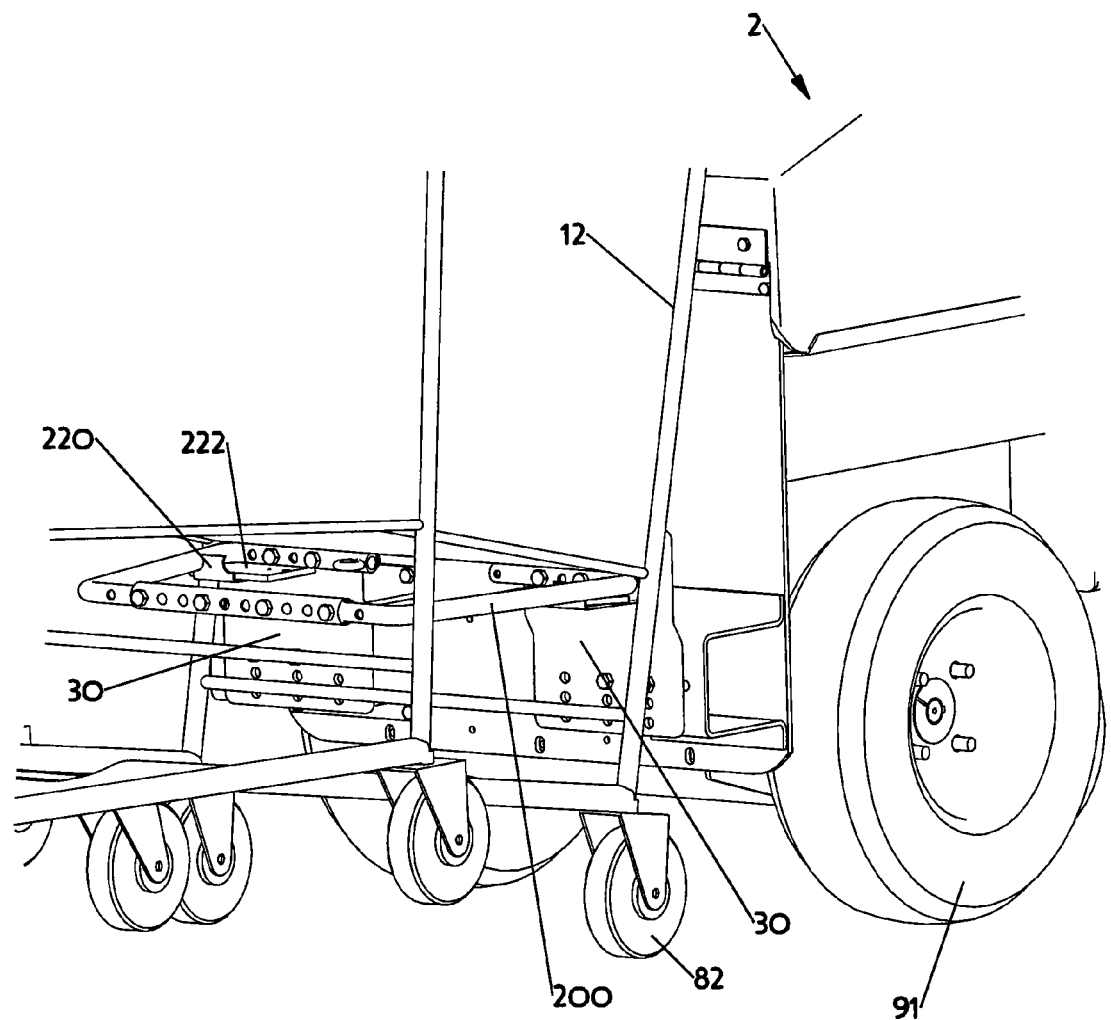
FIG. 11D is an enlarged view of the coupler assembly connecting to the shopping cart as depicted in FIG. 11C.
Figure 11E:
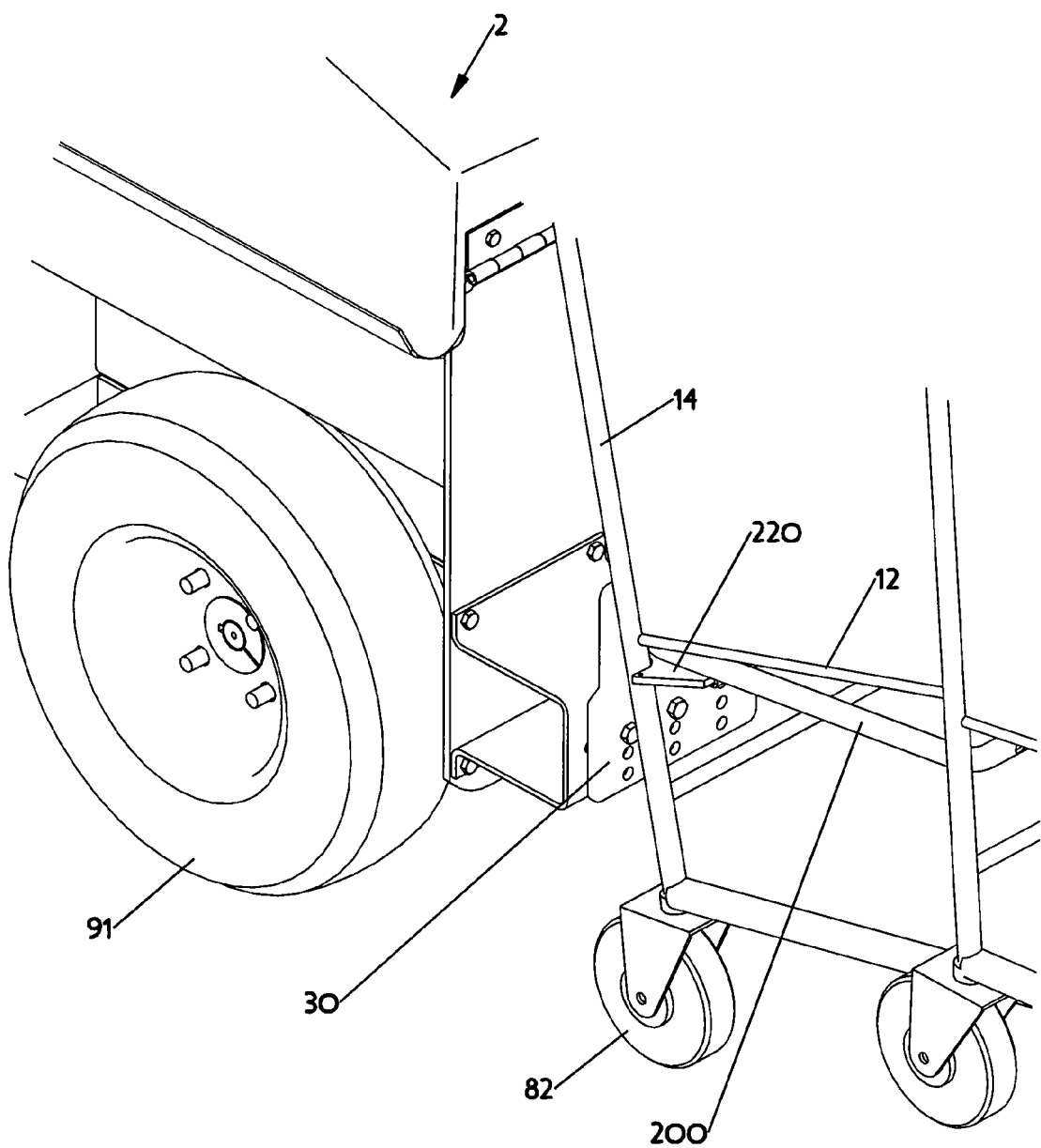
FIG. 11E is another enlarged view of the coupler assembly connecting to the shopping cart as depicted in FIG. 11C.

For a discussion of a variation of the cart emulator embodiment 200 depicted in FIGS. 11A-11B, reference is now made to FIGS. 11C-11E. FIG. 11C is a perspective view of the front end 6 of the retriever 2 attached to a shopping cart 12 via a configuration of the improved cart coupler assembly 4 that employs a cart emulator 200 provided with a tooth member 220. FIG. 11D is an enlarged view of the coupler assembly 4 connecting to the shopping cart 12 as depicted in FIG. 11C. FIG. 11E is another enlarged view of the coupler assembly 4 connecting to the shopping cart 12 as depicted in FIG. 11C.

FIGS. 11C-11E depict the same cart emulator 200 described above with reference to FIGS. 11A-11B, except the cart emulator 200 includes a locking device to secure the first shopping cart 12 to the cart coupler assembly 4. Various types of locking devices can be used with the cart emulator 200. For example, as shown in FIGS. 11C-11D, the locking device is defined by a first member 222 extending forward from each mounting plate 30 connected with an upward extending tooth member 220 that can engage various components of the first shopping cart 12 to hold it securely to the retriever 2. The locking device depicted in FIG. 15E is defined by a forward extending tooth member 220 connected with the right mounting plate 30 and engaging the vertical rear member 14 of the first shopping cart 12. The tooth members 220 depicted in FIGS. 11C-11E are used to lock the first shopping cart 12 to the cart emulator 200, so the first shopping cart 12 does not easily disengage from the retriever 2. In other embodiments, the locking device is spring loaded with a plurality of teeth that engage various components of the first shopping cart 12. The first shopping cart 12 is releasable at any time by disengaging the locking devices and pulling the first shopping cart away from the retriever 2.

Figure 11F:
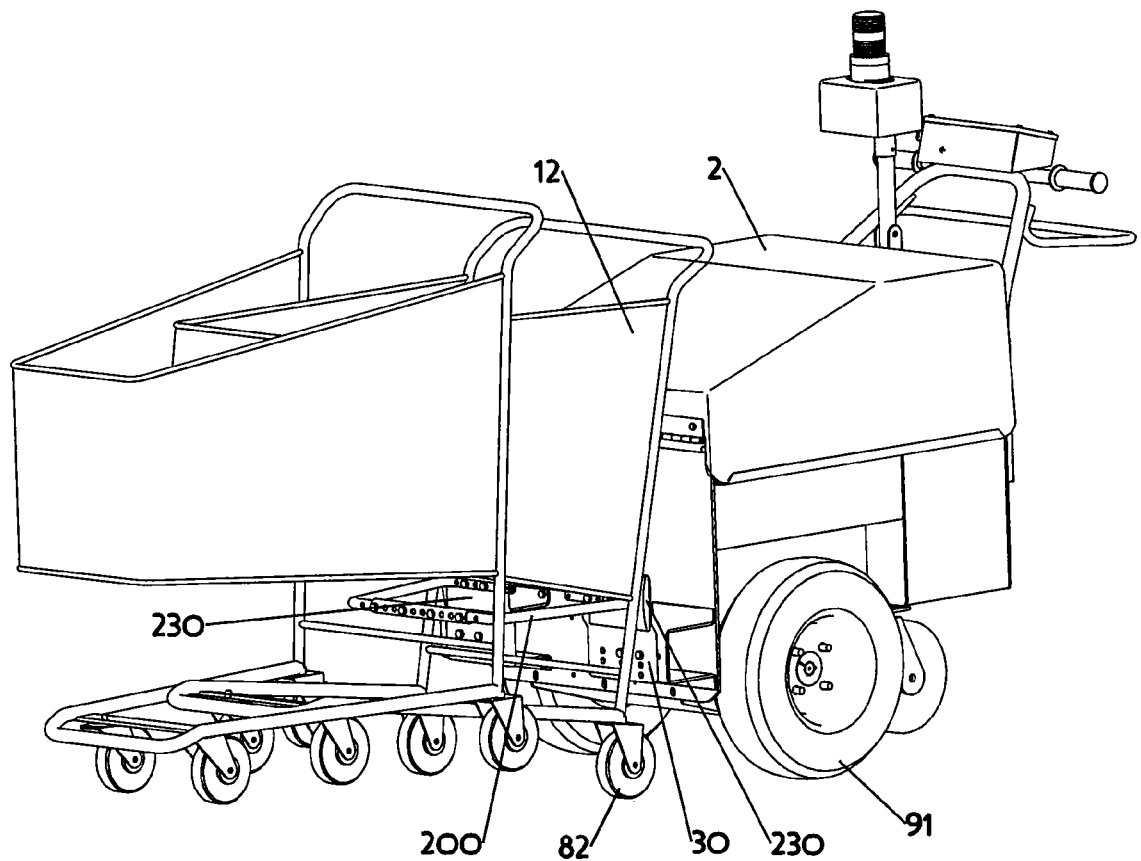
FIG. 11F is a perspective view of the front end of the retriever attached to a shopping cart via a configuration of the improved cart coupler assembly that employs a cart emulator provided with cushions.
Figure 11G:
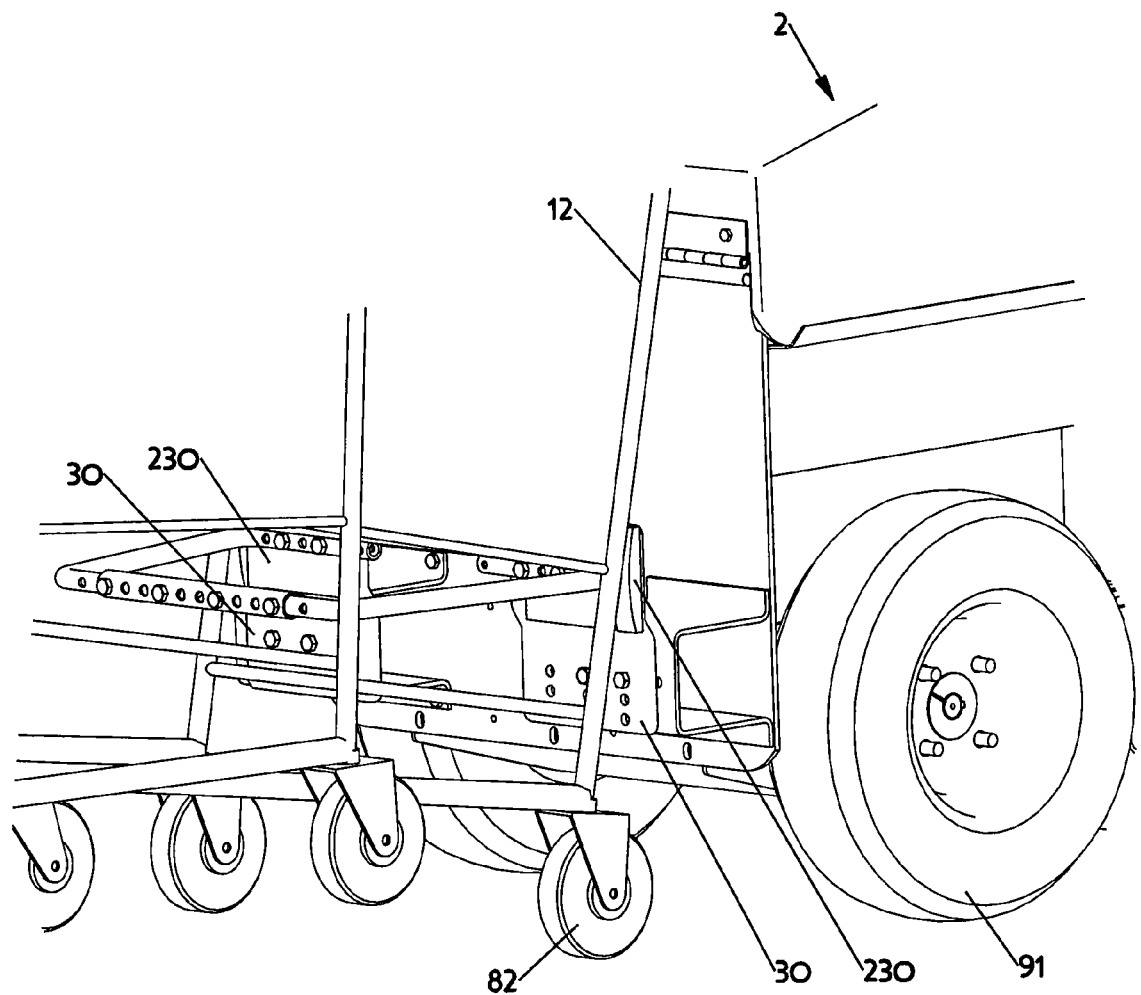
FIG. 11G is an enlarged view of the coupler assembly connecting to the shopping cart as depicted in FIG. 11F.

To minimize damage, such as crushing, scratching, denting, or rubbing components of either the retriever 2 or the first shopping cart 12, the cart coupler assemblies 4 previously described with reference to FIGS. 11A-11E can be equipped with cushions 230. For a discussion of such an embodiment, reference is now made to FIGS. 11F-11G. FIG. 11F is a perspective view of the front end 6 of the retriever 2 attached to a shopping cart 12 via a configuration of the improved cart coupler assembly 4 that employs a cart emulator 200 provided with cushions 230. FIG. 11G is an enlarged view of the coupler assembly 4 connecting to the shopping cart 12 as depicted in FIG. 11F.

As shown in FIGS. 11F-11G, a right cushion 230 is connected with the right mounting plate 30 and a left cushion 230 is connected with the left mounting plate 30. When the first shopping cart is engaged with retriever 2, the cushions 230 act as the contact point where the cart coupler assembly 4 contacts the first shopping cart 12 and thereby transmits pushing forces from the retriever 2 to the first shopping cart 12. The cushions 230 can be constructed of any material intended to protect the components of the retriever 2 and shopping cart 12 from damage, such as rubber or plastic. The cushions 230 can also help distribute the contact forces over a larger area.

Although various embodiments of this invention have been described above with a certain degree of particularity or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A shopping cart retriever adapted to move a string of shopping carts along a travel surface, wherein a shopping cart of the string of shopping carts includes wheels that rollably support the cart on the travel surface, a basket for receiving therein shopping items, and frame members that generally vertically extend between the wheels and the basket to support the basket above the wheels, wherein the basket includes a bottom, sides extending generally vertically upward from the bottom, and an open top defined by the sides, the retriever comprising:
    a body;
    a drive wheel operably coupled to the body and powered to drive the retriever along the travel surface; and
    a cart emulator extending generally horizontally from the body at a height above the travel surface such that when the cart emulator properly engages the shopping cart, the cart emulator is received below the bottom of the basket, the cart emulator including a pair of elongated members offset from each other and extending generally horizontally away from the body and a cross member joining the pair of elongated members at a free end of the cart emulator, wherein the cross member and at least one of the elongated members are telescopically related.

2. The shopping cart retriever of claim 1, wherein when the cart emulator properly engages the shopping cart, the cart emulator is also received above the wheels.

3. The shopping cart retriever of claim 2, wherein when the cart emulator properly engages the shopping cart, the cart emulator is also received between the frame members.

4. The shopping cart retriever of claim 1, wherein the cart emulator gradually slopes downward as it extends generally horizontally away from the body.

5. The shopping cart retriever of claim 4, wherein engaging the shopping cart with the cart emulator causes at least some of the wheels of the shopping cart to lift off of the travel surface.

6. The shopping cart retriever of claim 5, wherein the at least some of the wheels of the shopping cart are the rear wheels of the shopping cart.

7. The shopping cart retriever of claim 5, wherein the cart emulator causing at least some of the wheels of the shopping cart to lift off of the travel surface does not involve vertically displacing the cart emulator relative to the body.

8. The shopping cart retriever of claim 1, wherein engaging the shopping cart with the cart emulator causes at least some of the wheels of the shopping cart to lift off of the travel surface.

9. The shopping cart retriever of claim 8, wherein the at least some of the wheels of the shopping cart are the rear wheels of the cart shopping cart.

10. The shopping cart retriever of claim 1, wherein the bottom of the basket rests on the cart emulator when the cart emulator has fully engaged the shopping cart.

11. The shopping cart retriever of claim 1, wherein an offset distance between the elongated members can be adjusted to correspond to a width associated with the shopping cart.

12. The shopping cart retriever of claim 11, wherein the width associated with the shopping cart is the width between the frame members of the shopping cart.

13. The shopping cart retriever of claim 1, wherein the cart emulator is sloped such that the free end of the cart emulator is lower than an opposite end of the cart emulator operably coupled to the body.

14. The shopping cart retriever of claim 1, wherein the cart emulator further includes an engagement feature that engages a feature of the shopping cart to reduce the likelihood the shopping cart will inadvertently disengage from the cart emulator.

15. The shopping cart retriever of claim 14, where the engagement feature includes a tooth feature that engages the feature of the shopping cart.

16. The shopping cart retriever of claim 15, wherein the tooth is oriented upwards.

17. The shopping cart retriever of claim 15, wherein the tooth is spring loaded.

* * * * *